United States Patent
Esch et al.

(10) Patent No.: US 12,104,083 B2
(45) Date of Patent: Oct. 1, 2024

(54) EPOXY RESIN-BASED CATHODIC ELECTRODEPOSITION (CED) OF METAL COMPONENTS AS AN ADHESION PROMOTER FOR PU SYSTEMS

(71) Applicant: BASF Polyurethanes GmbH, Lemfoerde (DE)

(72) Inventors: Moritz Esch, Lemfoerde (DE); Andreas Horstmann, Lemfoerde (DE); Maximilian Maier, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 925 days.

(21) Appl. No.: 17/052,645

(22) PCT Filed: May 7, 2019

(86) PCT No.: PCT/EP2019/061632
§ 371 (c)(1),
(2) Date: Nov. 3, 2020

(87) PCT Pub. No.: WO2019/215119
PCT Pub. Date: Nov. 14, 2019

(65) Prior Publication Data
US 2021/0246319 A1    Aug. 12, 2021

(30) Foreign Application Priority Data
May 7, 2018   (EP) ..................... 18170983

(51) Int. Cl.
*F16F 1/37*    (2006.01)
*C09D 5/44*    (2006.01)
(Continued)

(52) U.S. Cl.
CPC ............ *C09D 5/4488* (2013.01); *C09D 7/65* (2018.01); *C09D 163/00* (2013.01);
(Continued)

(58) Field of Classification Search
CPC .... F16F 1/3605; F16F 1/37; F16F 1/38; F16F 1/3732; F16F 1/3735; F16F 1/40;
(Continued)

(56) References Cited

U.S. PATENT DOCUMENTS 2,992,939 A * 7/1961 Rice .................. C09J 125/12
260/DIG. 37
3,956,451 A * 5/1976 Adams .................. B60B 5/02
264/46.7
(Continued)

FOREIGN PATENT DOCUMENTS

DE    10 2007 022 379    11/2008
DE    10 2009 001 312    9/2009
(Continued)

OTHER PUBLICATIONS

International Search Report issued on Jul. 15, 2019 in PCT/EP2019/061632 filed on May 7, 2019, 2 pages.

*Primary Examiner* — Bradley T King
(74) *Attorney, Agent, or Firm* — Grüneberg and Myers PLLC

(57) ABSTRACT

The present invention relates to a composite element, especially for a damping element, comprising a) at least one metallic body having a surface; b) a coating comprising an epoxy resin on at least part of the surface of the metallic body; c) a plastics body comprising at least one polyurethane, which at least partly surrounds the metallic body of (a) and in the region of the surround is at least partly in direct contact with the coating of (b), wherein the composite element between the surface of the metallic body (a) and the coating (b) has a conversion layer (d) which comprises at least one compound selected from the group of zirconium (IV) oxide, zinc(II) phosphate, and chromate. The invention further relates to a damping element comprising the composite element and at least one further body which is at least
(Continued)

partly in direct contact with the composite element, preferably with the plastics body of (c). The invention additionally relates to production processes for composite element and damping element, respectively, to the composite and damping elements, respectively, that are produced or producible by these processes, and the use of these composite and damping elements, respectively.

7 Claims, 6 Drawing Sheets

(51) Int. Cl.

| | | |
|---|---|---|
| C09D 7/65 | (2018.01) | |
| C09D 163/00 | (2006.01) | |
| C09D 175/06 | (2006.01) | |
| F16F 1/36 | (2006.01) | |
| F16F 1/38 | (2006.01) | |

(52) U.S. Cl.
CPC .......... *C09D 175/06* (2013.01); *F16F 1/3605* (2013.01); *F16F 1/38* (2013.01); *F16F 1/3842* (2013.01); *F16F 1/37* (2013.01); *F16F 2224/0208* (2013.01); *F16F 2224/0225* (2013.01); *F16F 2224/025* (2013.01); *F16F 2226/02* (2013.01); *F16F 2226/04* (2013.01); *F16F 2234/02* (2013.01); *F16F 2234/06* (2013.01)

(58) Field of Classification Search
CPC .......... F16F 2224/0208; F16F 2226/02; F16F 2226/04; F16F 2234/02; F16F 2234/06; C09D 5/4488; C09D 7/65; C09D 163/00; C09D 175/06

See application file for complete search history.

(56) References Cited

U.S. PATENT DOCUMENTS

| | | | | |
|---|---|---|---|---|
| 4,073,858 A | * | 2/1978 | Chung | F16F 1/3605 267/152 |
| 4,311,765 A | * | 1/1982 | Chung | C08G 18/12 428/458 |
| 5,972,450 A | * | 10/1999 | Hsieh | F16L 58/109 138/146 |
| 6,082,721 A | * | 7/2000 | Kingsley | F16C 23/04 411/359 |
| 6,274,649 B1 | | 8/2001 | Ott et al. | |
| 6,428,645 B1 | * | 8/2002 | Rau | F16F 1/3842 428/416 |
| 8,231,116 B2 | * | 7/2012 | Nishi | F16F 13/10 267/140.3 |
| 8,459,621 B2 | | 6/2013 | Cook et al. | |
| 2002/0182357 A1 | * | 12/2002 | Soles | F16L 9/147 264/46.7 |
| 2003/0119969 A1 | * | 6/2003 | Green | C08L 15/02 524/415 |
| 2003/0153682 A1 | * | 8/2003 | Sakugawa | C08G 77/42 525/100 |
| 2006/0214341 A1 | * | 9/2006 | Sugiura | F16F 1/3842 267/293 |
| 2007/0254123 A1 | * | 11/2007 | Tohyama | C23C 28/00 427/407.1 |
| 2011/0135867 A1 | | 6/2011 | Cook et al. | |
| 2011/0222803 A1 | * | 9/2011 | Noble | F16F 1/3842 29/898.054 |
| 2013/0196173 A1 | * | 8/2013 | Park | B01J 13/185 264/4.1 |
| 2014/0302334 A1 | * | 10/2014 | Hintze-Bruning | C09D 15/00 427/386 |
| 2017/0226354 A1 | * | 8/2017 | Iijima | C25D 13/04 |
| 2017/0298236 A1 | * | 10/2017 | Ott | C09D 5/4453 |
| 2019/0160906 A1 | * | 5/2019 | Umeno | B60G 11/14 |
| 2021/0129488 A1 | * | 5/2021 | Takahashi | B32B 15/095 |
| 2023/0167311 A1 | * | 6/2023 | Woodworth | C09D 7/43 106/287.24 |

FOREIGN PATENT DOCUMENTS

| | | |
|---|---|---|
| DE | 20 2011 110 249 U1 | 7/2013 |
| EP | 1 171 515 B1 | 10/2002 |
| EP | 0 961 797 B1 | 4/2003 |
| EP | 1 379 588 | 1/2004 |
| EP | 1 379 568 B1 | 8/2010 |
| WO | WO 98/33835 A1 | 8/1998 |
| WO | WO 02/072689 A1 | 9/2002 |

* cited by examiner

EPOXY RESIN-BASED CATHODIC ELECTRODEPOSITION (CED) OF METAL COMPONENTS AS AN ADHESION PROMOTER FOR PU SYSTEMS

The present invention relates to a composite element, especially for a damping element, comprising a) at least one metallic body having a surface; b) a coating comprising an epoxy resin on at least part of the surface of the metallic body; c) a plastics body comprising at least one polyurethane, which at least partly surrounds the metallic body of (a) and in the region of the surround is at least partly in direct contact with the coating of (b), wherein the composite element between the surface of the metallic body (a) and the coating (b) has a conversion layer (d) which comprises at least one compound selected from the group of zirconium (IV) oxide, zinc(II) phosphate, and chromate. The invention further relates to a damping element comprising the composite element and at least one further body which is at least partly in direct contact with the composite element, preferably with the plastics body of (c). The invention additionally relates to production processes for composite element and damping element, to the composite and damping elements, respectively, that are produced or producible by these processes, and the use of these composite and damping elements, respectively.

Damping elements have been known in principle for a long time, and are used in diverse sectors. They serve to absorb kinetic energy from units or assemblies. Impact dampers and vibration dampers are general knowledge across a wide variety of different motor vehicles and aircraft, where they are able, as safety-relevant components, to rapidly attenuate the vibrations of the sprung mass in question. In the case of vehicles, the tuning of suspension and damping that is performed by the tire/wheel suspension system is a hallmark of the character of the vehicle in terms of driving dynamics and driving comfort. Depending on the geometry of a vehicle axle, vibration dampers are connected to the wheel suspension system at the upper end or at both ends by way of an elastic bearing, with the damping elements used often being hybrid systems composed of plastics and metal components. In view of the ever-greater forces which act on a damping element of this kind, these hybrid systems are noticeably strained to their limits—the connection between plastics elements and metal elements is usually insufficient, and there is partial or entire separation of these components, with adverse consequences for the entire damping bearing.

Where steel materials, for example, are used as a metallic body in damping elements, the only usual concern to date has been that of sufficient corrosion protection. This protection is typically ensured by electroplating the metallic body with a zinc-iron coating (ZnFe) or with a zinc-nickel coating (ZnNi). In damping elements, then, metallic bodies of this kind which have been coated to counter corrosion have been directly connected to the plastics body in question, by means, for example, of reactive polyurethane (PU) casting methods. The application of a lap shear force above the breaking force, however, then produced adhesive parting of the plastics body from the ZnFe or ZnNi coating, with the above-described adverse consequences for the damping element. In order to ensure sufficient robustness of the damping element, the fracture mode to be set as a target is instead, in a lap shear test, a cohesive fracture in the plastics body. This has typically been achieved by applying a standard one- or two-component wet-chemical adhesion promoter to the corrosion control layer. Applying an additional adhesion promoter to the corrosion control layer, however, entails additional costs and necessitates additional costly and time-consuming steps in the production of the damping element. Especially if the adhesion promoter must be applied only partially, in order to keep screw tightening faces on the metallic body free, for example, the application method is laborious and involves high costs, so making the damping element uneconomic to produce.

U.S. Pat. No. 8,459,621 B1 describes a polyurethane coating which is used as an adhesion promoter between a further, microcellular, polyurethane and a metallic element. The polyurethane layer here acts as corrosion control and binds at a molecular level to the microcellular polyurethane, for which the polyurethane coating is required to have free active functionalities, which react with free isocyanate groups of the microcellular polyurethane during polymerization, to form covalent allophanate bonds—therefore, for the attachment of the microcellular polyurethane to the polyurethane coating, an additional step of curing/polymerization is needed.

It was an object of the present invention, therefore, to provide a composite element or damping element which does not have the above-stated disadvantages, and to provide a production process for a composite or damping element that is extremely simple and ought to involve a minimum of necessary steps.

This object is achieved in accordance with the invention by means of a composite element, especially for a damping element, comprising
  a) at least one metallic body having a surface;
  b) a coating comprising an epoxy resin on at least part of the surface of the metallic body;
  c) a plastics body comprising at least one polyurethane, which at least partly surrounds the metallic body of (a) and in the region of the surround is at least partly in direct contact with the coating of (b).

It surprisingly emerged that an epoxide coating, in terms of the requirements for adhesion promotion between a plastics body and a metallic body, was clearly superior to a pure electroplated corrosion control coating (ZnNi or ZnFe) and met the requirements for adhesion promotion between a plastics body and a metallic body equally well as a combination of a conventional electroplated corrosion control coating (ZnNi or ZnFe) and an adhesion promoter applied additionally for that purpose. Surprisingly it was found that the coating based on epoxy resin had the advantage that it fulfilled at the same time the function of corrosion control and of adhesion promotion, and was therefore much lower in terms of the processing costs and the number of required processing steps than when using an electroplated form of corrosion control with additional wet-chemically applied adhesion promoter.

Additionally, the epoxide layer can also be used in the region of the screw connection of the damping elements, thereby enabling a more economic process, such as a deposition process, for example, for coating, rather than expensive partial application of an adhesion promoter. Additionally, in the case of metallic bodies made of nonferrous metals, such as aluminum, for example, where no additional corrosion control is required, the epoxy resin coating can also be used more economically for promoting adhesion than can a wet-chemical, partially applied adhesion promoter.

In one embodiment of the composite element, the coating comprising an epoxy resin of (b) is applied or applicable to at least part of the surface of the metallic body of (a) by means of a method selected from the group consisting of spraying and surface coating, preferably surface coating, more preferably deposition coating, more preferably cathodic deposition coating.

The metallic body of (a) preferably has no corrosion control coating on its surface, meaning that its surface does not carry any iron coating (ZnFe) or zinc-nickel coating (ZnNi). The coating comprising an epoxy resin of (b) is therefore applied directly on at least part of the surface of the metallic body of (a).

Epoxy Resin of (b)

The epoxy resin of (b) is in principle not subject to any restrictions. The epoxy resin of (b) is preferably an epoxy resin which is preferably obtained or obtainable from a water-containing epoxy resin dispersion, which has preferably more than 50 weight % of water, based on the total weight of the water-containing epoxy resin dispersion.

The epoxy resin dispersion preferably comprises an epoxy resin having ammonium groups, which with further preference is obtained or obtainable by A) reacting at least the components
  i) a precursor prepared or preparable, with addition of phosphines and/or phosphine salts as catalyst, from
    i.a) at least one diepoxide compound;
    i.b) at least one mono- or diphenol or a mixture of a mono- and a diphenol;
  ii) at least one organic amine;
  at an addition temperature in the range from 60 to 130° C. to give an epoxide-amine adduct;
B) subsequently or simultaneously reacting the secondary hydroxyl groups, formed in the reaction of components i.a) and i.b), with epoxide groups of the epoxide-amine adduct prepared in stage A), at a temperature of 110 to 150° C.,
C) adding at least one crosslinking agent at a temperature of <150° C.,
D) neutralizing;
E) dispersing the mixture obtained in stages A) to D) in water.

A corresponding epoxy resin dispersion is described for example in EP 0 961 797 B1. The water-containing dispersion preferably has a solids content in the range from 35 to 45 weight %, with the viscosity simultaneously being sufficiently low. Component (i.a) used in the precursor of (i) may be any compounds which contain two reactive epoxide groups and have an epoxide equivalent weight (EEW) which is preferably below 1000, preferably below 500. Particularly preferred diepoxide compounds are diglycidyl ethers of polyphenols, prepared from polyphenols and epihalohydrins. Polyphenols used may be one or more compounds selected from the group consisting of bisphenol A, bisphenol F, 1,1-bis(4-hydroxyphenyl)-n-heptane, 4,4'-dihydroxybenzophenone, 1,1-bis(4-hydroxyphenyl)ethane, 1,1-bis(4-hydroxyphenyl)isobutane, 2,2-bis(4-hydroxy-tert-butylphenyl)propane, bis(2-hydroxynaphthyl)methane, 1,5-dihydroxynaphthalene, and phenolic novolac resin. Other preferred diepoxide compounds are diglycidyl ethers of polyhydric alcohols such as ethylene glycol, diethylene glycol, triethylene glycol, 1,2-propylene glycol, 1,4-propylene glycol, 1,5-pentanediol, 1,2,6-hexanetriol, glycerol, and 2,2-bis(4-hydroxycyclohexyl)propane. Use may also be made of diglycidyl esters of polycarboxylic acids such as, for example, oxalic acid, succinic acid, glutaric acid, terephthalic acid, 2,6-naphthalenedicarboxylic acid, and dimerized linolenic acid. Typical examples are glycidyl adipate and glycidyl phthalate. Additionally suitable are hydantoin epoxides, epoxidized polybutadiene, and diepoxide compounds obtained by epoxidizing an olefinically unsaturated alicyclic compound. Particularly preferred for use as diepoxide compound of (i.a) is a diglycidyl ether of bisphenol A which is prepared from bisphenol A and epihalohydrins and which with particular preference has an EEW of less than 500, more preferably of less than 300, more preferably of less than 200.

Compounds used as component (i.b) of the precursor of (i) are monophenols, diphenols, e.g., bisphenol A, or mixtures of mono- and diphenols, preferably at least bisphenol A. The reaction in stage (i) is carried out preferably at 120 to 180° C., preferably 125 to 150° C. Little solvent is optionally added in this stage Preferred for this purpose are xylene or propylene glycol monoalkyl ethers such as propylene glycol methyl or ethyl ether. The addition of phosphine or of phosphine derivatives and/or phosphine salts as catalysts controls the reaction of components (i.a) and (i.b) in such a way that only phenolic hydroxyl groups, but not secondary hydroxyl groups, react with epoxide groups. The secondary hydroxyl groups are formed in the reaction of components (i.a) and (i.b). The phosphine used may be any desired phosphine which contains no disrupting groups. Examples of such phosphines are aliphatic, aromatic or alicyclic phosphines, with specific examples including the following phosphines: Lower trialkylphosphines, such as trimethylphosphine, triethylphosphine, tripropylphosphine, tributylphosphine, mixed lower alkylphenylphosphines, which as phenyldimethylphosphine, phenyldiethylphosphine, phenyldipropylphosphine, diphenylmethylphosphine, diphenylethylphosphine, diphenylpropylphosphine, triphenylphosphine, alicyclic phosphines, such as tetramethylene-ethylphosphine and the like. Particular preference is given to triphenylphosphine. The selective conversion of the phenolic hydroxyl groups, controlled in a targeted way by adding the aforementioned catalysts, has the effect that the average molecular weight of the precursor (i) is below 1500 g/mol, preferably below 1000 g/mol. The solids content of the precursor is 90 weight %, preferably 95-100 weight %. In stage (ii) it is possible, after/with reduction of the reaction temperature, to add primary, secondary or tertiary amines and/or salts thereof, or a mixture of these compounds, to the reaction mixture obtained in stage (i). The temperatures are preferably 60 to 130° C., preferably 90 to 115° C. The amine is preferably a water-soluble compound. Examples of such amines are mono- and dialkylamines, such as methylamine, ethylamine, propylamine, butylamine, dimethylamine, diethylamine, dipropylamine, methylbutylamine, and the like. Likewise suitable are alkanolamines such as, for example, methylethanolamine, diethanolamine, and the like. Additionally suitable are dialkylaminoalkylamines such as, for example, dimethylaminoethylamine, diethylaminopropylamine, dimethylaminopropylamine, and the like. Low molecular weight amines are used in the majority of cases, although it is also possible to employ monoamines of higher molecular weight. Polyamines having primary and secondary amino groups can be reacted in the form of their ketimines with the epoxide groups. The ketimines are prepared from the polyamines in a known way. As a salt of an amine it is possible with preference to use the salt of a tertiary amine. The amine moiety of the amine-acid salt is an amine which may be unsubstituted or substituted as in the case of hydroxylamine, in which case said substituents ought not to disrupt the reaction of the amine-acid salt with the polyepoxide, and the reaction mixture is not to gel. Preferred amines are tertiary amines, such as dimethylethanolamine, triethylamine, trimethylamine, triisopropylamine, and the like. Particular preference is given to using, as at least one organic amine of (ii), diethanolamine or dimethylaminopropylamine, or a mixture of diethanolamine or dimethylaminopropylamine.

In stage A) it is possible, before or after addition of the amine, to add, optionally, plasticizers and/or nonvolatile diluents based on mono- or polyfunctional alcohols. Examples which can be used are polypropylene glycol compounds such as Pluriol P 600, P900, PE 3100, or Plastilit 3060 (all trade marks of BASF). Preference is given to using at least one polypropylene glycol compound such as Plastilit 3060. Other preferred embodiments of the epoxy resin dispersion and of the process for its preparation are described in EP 0 961 797 B1.

Stage A) produces compounds which contain free epoxide groups. The epoxy equivalent weights may be between 200 and 2000 g/mol of component A), preferably 400 and 700 g/mol. The epoxide groups remaining after stage A) are reacted in stage B) at elevated temperatures with secondary hydroxyl groups which have been formed during the reaction of components a) and b). The reaction is carried out preferably at 110-150° C., more preferably at 130° C. If the temperature increase is not sufficient to lower the viscosity, which has likewise grown as a result of the increase in the molecular weight, then additional measures may be taken. The reaction in stage B) is carried out preferably in the presence of catalysts. Particular preference is given to working in the presence of tertiary amino groups.

The binders thus prepared are admixed in stage C) with crosslinking agents. Suitable crosslinking agents include virtually all compounds with a functionality of at least two that react with hydroxyl groups, examples being polyalcohols, polyphenols, blocked polyisocyanates, phenoplast resins or aminoplast resins. The crosslinking agents are used in general in an amount of 5 to 50, preferably 25 to 40 weight %, based on the binder, and at a temperature of <150° C., preferably 90 to 130° C., with preferred crosslinking agents having been described in EP 0 961 797 B1. Examples of suitable aminoplast-resin crosslinking agents are the hexamethyl ether of hexamethylolmelamine, the triethyltrimethyl ether of hexamethylolmelamine, the hexabutyl ether of hexamethylolmelamine, and the hexamethyl ether of hexamethylolmelamine, and polymeric butylated melamine-formaldehyde resins. Alkylated urea-formaldehyde resins can also be used. Crosslinking agents used are preferably blocked polyisocyanates. Any desired polyisocyanates may be utilized in which the isocyanate groups have been reacted with a compound such that the blocked polyisocyanate formed is stable to hydroxyl groups at room temperature, but reacts at elevated temperatures, generally in the range from about 90 to about 300° C. The blocked polyisocyanates may be prepared using any desired organic polyisocyanates that are suitable for crosslinking. Preference is given to the isocyanates which contain about 3 to about 36, more particularly about 8 to about 15, carbon atoms. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluene 2,4-diisocyanate, toluene 2,6-diisocyanate, diphenylene 4,4'-diisocyanate, naphthylene 1,5-diisocyanate, naphthylene 1,4-diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether, and 2,3-bis(8-isocyanatooctyl)-4-octyl-5-hexylcyclohexene.

Polyisocyanates of higher isocyanate functionality may also be used. Examples of such are tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane, and polymeric polyisocyanates, such as dimers and trimers of diisocyanatotoluene. Furthermore, mixtures of polyisocyanates can also be utilized. The organic polyisocyanates suitable as crosslinking agents in the invention may also be prepolymers, deriving, for example, from a polyol, including a polyether polyol or a polyester polyol. For the blocking of the polyisocyanates it is possible to use any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; and aromatic alkyl alcohols, such as phenylcarbinol and methylphenylcarbinol. Other suitable blocking agents are hydroxylamines such as ethanolamine, oximes such as methyl ethyl ketone oxime, acetone oxime, and cyclohexanone oxime, or amines such as dibutylamine and diisopropylamine. The stated polyisocyanates and blocking agents may also be used in suitable proportions for preparing the above-described partly blocked polyisocyanates. Particularly preferred for use as a crosslinking agent of (C) is a blocked polyisocyanate which is obtained or obtainable by reaction of diphenylene 4,4'-diisocyanate with butyl diglycol.

Suitable polyphenols are described in EP 0 961 797 B1, especially in paragraphs to In stage D), finally, a neutralization is carried out. This is accomplished preferably by addition of acids at 90 to 110° C. Lastly, in stage E), the mixture obtained in stages A) to D) is dispersed with addition of water. In another embodiment it is also possible to add the neutralizing acid to water and to disperse the resin mixture into the acidified water.

In one preferred embodiment of the epoxy resin or of the epoxy resin dispersion, an epoxy resin is used which contains ammonium groups and which with further preference is obtained or obtainable by
  A) reacting at least the components
    i) a precursor prepared or preparable, with addition of phosphines and/or phosphine salts, which comprise at least triphenylphosphine, as catalyst, from
      i.a) at least one diepoxide compound, which comprises at least one diglycidyl ether of bisphenol A;
      i.b) at least one mono- or diphenol or a mixture of a mono- and a diphenol, which comprises at least bisphenol A;
    ii) at least one organic amine, which comprises at least diethanolamine and/or dimethylaminopropylamine; where optionally at least one polypropylene glycol compound, more preferably Plastilit 3060, is added before or after addition of the amine of (ii);
    at an addition temperature in the range from 60 to 130° C. to give an epoxide-amine adduct;
  B) subsequently or simultaneously reacting the secondary hydroxyl groups, formed in the reaction of components i.a) and i.b), with epoxide groups of the epoxide-amine adduct prepared in stage A), at a temperature of 110 to 150° C.;
  C) adding at least one crosslinking agent, which comprises at least one blocked polyisocyanate which is obtained or obtainable by reaction of diphenylene 4,4'-diisocyanate with butyl diglycol, at a temperature of <150° C.;

D) neutralizing;

E) dispersing the mixture obtained in stages A) to D) in water.

The particle size of the dispersed phase is 30 to 1000 nm, preferably 50 to 180 nm. Further additions to the water-containing epoxy resin dispersion, and also corresponding pigment pastes, are likewise described in EP 0 961 797 B1. A water-containing epoxy resin dispersion which is particularly suitable in the context of one embodiment is the binder dispersion C of example 2.3 of EP 0 961 797 B1.

Coating Comprising an Epoxy Resin of (b)

The coating comprising an epoxy resin of (b) is in principle not subject to any restrictions in terms of its thickness. In one embodiment of the composite element, the coating of (b) has a layer thickness in the range from 1 to 100 micrometers, preferably in the range from 5 to 60 micrometers, more preferably in the range from 10 to 50 micrometers, more preferably in the range from 20 to 40 micrometers, determined according to DIN EN ISO 2808.

Additionally the coating of (b) preferably has a dry film density in the range from 0.5 to 5 g/cm$^3$, preferably in the range from 1 to 2.5 g/cm$^3$, more preferably in the range from 1.1 to 2.0 g/cm$^3$, more preferably in the range from 1.3 to 1.4 g/cm$^3$ determined according to DIN 53219.

Polyurethane of the Plastics Body of (c)

The plastics body of (c) of the composite element comprises at least one polyurethane, which is preferably obtained or obtainable by reacting at least the components (iii) a polyisocyanate composition;
(ii) a polyol composition;
(v) optionally a chain extender composition.

The polyisocyanate composition of (iii) comprises at least one polyisocyanate selected from the diisocyanates, preferably selected from the group consisting of naphthalene 1,5-diisocyanate (1,5-NDI), 3,3'-dimethylbiphenyl-4,4'-diyl diisocyanate (TODI), diphenylmethane 2,2'-diisocyanate (2,2'-MDI), diphenylmethane 2,4'-diisocyanate (2,4'-MDI), diphenylmethane 4,4'-diisocyanate (4,4'-MDI), carbodiimide-modified 4,4'-MDI, hexamethylene 1,6-diisocyanate (HDI), and methylenedicyclohexyl 4,4'-, 2,4', and 2,2'-diisocyanate (H12MDI), and higher polycyclic homologs of methanediphenyl diisocyanate (polymeric MDI), more preferably at least 4,4'-MDI or carbodiimide-modified 4,4'-MDI, or a mixture of 4,4'-MDI and carbodiimide-modified 4,4'-MDI. The polyol composition of (iv) comprises at least one polyester polyol, polyether polyol or polyetherester polyol, preferably selected from the group of di- to hexafunctional polyester polyols and polyether polyols, preferably from the group of the di- and trifunctional polyester polyols, preferably from the group of the di- and trifunctional adipic esters. The chain extender composition of (iv) comprises at least one compound which has at least two isocyanate-reactive functional groups, preferably two isocyanate-reactive functional groups, with the isocyanate-reactive functional groups being preferably selected from the group of hydroxyl group, amino group, and thiol group, and the at least one compound which has isocyanate-reactive functional groups is more preferably selected from the group consisting of monoethylene glycol, 1,4-butanediol, diethylene glycol, glycerol, trimethylolpropane, and 2,4-diamino-3,5-di(methylthio) toluene, and more preferably comprises at least 1,4-butanediol.

In one preferred embodiment of the composite element, the polyisocyanate composition (iii) is present in the form of an isocyanate-terminated prepolymer (iii.a), obtained or obtainable from the reaction of polyisocyanate composition (iii) with a part of the polyol composition (iv), and the polyurethane is obtained or obtainable by reacting at least the components (iii.a) isocyanate-terminated prepolymer;
(iv.a) remaining part of the polyol composition (iv);
(v) optionally chain extender composition.

The at least one polyurethane of the plastics body of (c) is preferably a polyurethane casting elastomer or a polyurethane foam, more preferably a polyurethane casting elastomer.

In one particularly preferred embodiment, the polyurethane of the plastics body of (c) is a polyurethane casting elastomer which is obtained or obtainable by reacting a prepolymer based on diphenylmethane 4,4'-diisocyanate, carbodiimide-modified 4,4'-MDI; linear polyester diol having a hydroxyl number in the range from 35 to 120 mg KOH/g, synthesized from adipic acid, ethylene glycol, and 1,4-butanediol, and/or a branched polyester diol having a hydroxyl number in the range from 35 to 120 mg KOH/g, synthesized from adipic acid, ethylene glycol, and 1,4-butanediol; in each case having an NCO content in the range from 10 to 28 weight %; with a polyol, which preferably comprises and more preferably is a linear polyester diol having a hydroxyl number in the range from 35 to 120 mg KOH/g, synthesized from adipic acid, ethylene glycol, and 1,4-butanediol; and where the chain extender used comprises at least one linear aliphatic diol having 2 to 6 carbon atoms, more preferably at least 1,4-butanediol. Preferably after preliminary heating to temperatures in the range from 30 to 70° C., more preferably in the range from 40 to 60° C., polyol component and polyisocyanate component, preferably prepolymer are combined and then reacted in the form of a reactive mixture at a temperature in the range from 80 to 100° C. There is preferably a thermal aftertreatment for an interval of 24 to 48 hours at a temperature in the range from 80 to 100° C.

Metallic Body

The metal of the metallic body is in principle not subject to any restrictions, embracing pure metals and alloys. The metallic body of the composite element preferably comprises an iron alloy, preferably steel, or aluminum. In one embodiment the metallic body comprises an iron alloy, preferably steel, and preferably consists to an extent of at least 99 weight % of steel, based on the total weight of metallic body. In a further embodiment the metallic body comprises aluminum, and preferably consists to an extent of at least 99 weight % of aluminum, based on the total weight of the metallic body. With regard to the shape there are likewise no restrictions in principle on the metallic body. The metallic body of the composite element preferably has a shape selected from the group consisting of disk, perforated disk, ring, cylinder, and hollow cylinder, where a hollow cylinder preferably also comprises a sleeve.

In one preferred embodiment of the composite element the element, between the surface of the metallic body (a) and the coating (b), has a conversion layer (d), which comprises at least one compound selected from the group of zirconium (IV) oxide, zinc(II) phosphate, and chromate, preferably at least zirconium(IV) oxide and/or zinc phosphate, more preferably at least zirconium(IV) oxide. Chromate in this context embraces diverse salts of chromic acid obtained or obtainable by the action of chromic acid (chromatin), preferably with the exception of Cr(VI) compounds. Zirconium (IV) oxide is preferably present alone or in a mixture with molybdenum oxide and/or with one or more polyorganosilanes. Conversion layers (d) containing zirconium(IV) oxide preferably contain 1 to 100 mg/m2, preferably 1 to 80 mg/m2, more preferably 2 to 50 mg/m2 of zirconium, determined in each case by X-ray fluorescence (XRF) analysis. Zinc(II) phosphate is applied alone or in a mixture with other phosphates of transition group elements, preferably alone or in a mixture with Ni(II) phosphate and/or Mn(II) phosphate.

Damping Element

The invention additionally relates to a damping element, wherein the damping element comprises (1) a composite element comprising
  a) a metallic body having a surface;
  b) a coating comprising an epoxy resin on at least part of the surface of the metallic body;
  c) a plastics body comprising at least one polyurethane, which at least partly surrounds the metallic body of (a) and in the region of the surround is at least partly in direct contact with the coating of (b);
(2) at least one further body which is at least partly in direct contact with the composite element of (1), preferably with the plastics body of (c).

In one preferred embodiment of the damping element the at least one further body has a coating (b') comprising an epoxy resin on at least part of its surface. The coating comprising an epoxy resin of (b) or (b') on at least part of the surface of the metallic body of (a) or on at least part of surface of the at least one further body, respectively, is applied or applicable by means of a method selected from the group consisting of spraying and surface coating, preferably surface coating, more preferably deposition coating, more preferably cathodic deposition coating. The metallic body of (a) of the damping element also has no corrosion control coating on its surface, meaning that on its surface there is no iron coating (ZnFe) or zinc-nickel coating (ZnNi). The coating comprising an epoxy resin of (b) or (b') is therefore applied directly on at least part of the surface of the metallic body of (a) or on at least part of the surface of the at least one further body, respectively.

The epoxy resin of (b) or (b') comprises an epoxy resin which is preferably obtained or obtainable from a water-containing epoxy resin dispersion, which has preferably more than 50 weight % of water, based on the total weight of the water-containing epoxy resin dispersion. The epoxy resin dispersion comprises an epoxy resin containing ammonium groups, as already described above for the epoxy resin dispersion for the composite element; in other words, for the epoxy resin of (b) or (b') of the damping element, the epoxy resin or water-containing epoxy resin dispersion used is the same as that already described above for the composite element, especially in the section "Epoxy resin of (b)" there. In the case of the damping element as well, the coating of (b) or (b') has a layer thickness in the range from 1 to 100 micrometers, preferably in the range from 5 to 60 micrometers, more preferably in the range from 10 to 50 micrometers, more preferably in the range from 20 to 40 micrometers, determined according to DIN EN ISO 2808; and also a dry film density in the range from 0.5 to 5 g/cm³, preferably in the range from 1 to 2.5 g/cm³, more preferably in the range from 1.1 to 2.0 g/cm³, more preferably in the range from 1.3 to 1.4 g/cm³, determined according to DIN 53219.

The at least one polyurethane of the plastics body of (c) of the damping element is likewise obtained or obtainable by reacting at least the components:
(iii) a polyisocyanate composition;
(iv) a polyol composition;
(v) optionally a chain extender composition;

wherein the polyisocyanate composition of (iii), the polyol composition of (iv), and the chain extender composition of (iv) are the same as those already described above for the composite element in the section "Polyurethane of the plastics body of (c)". For the damping element as well, the polyisocyanate composition (iii) is present in the form of an isocyanate-terminated prepolymer (iii.a), obtained or obtainable from the reaction of polyisocyanate composition (iii) with a part of the polyol composition (iv), and the polyurethane is obtained or obtainable by reacting at least the components (iii.a) isocyanate-terminated prepolymer;
(iv.a) remaining part of the polyol composition (iv);
(v) optionally chain extender composition.

For the damping element equally it is the case that the at least one polyurethane of the plastics body of (c) is preferably a polyurethane casting elastomer or a polyurethane foam, more preferably a polyurethane casting elastomer. In one particularly preferred embodiment of the damping element as well, the polyurethane of the plastics body of (c) is a polyurethane casting elastomer which is obtained or obtainable by reacting a prepolymer based on diphenylmethane 4,4'-diisocyanate, carbodiimide-modified 4,4'-MDI; linear polyester diol having a hydroxyl number in the range from 35 to 120 mg KOH/g, synthesized from adipic acid, ethylene glycol, and 1,4-butanediol, and/or a branched polyester diol having a hydroxyl number in the range from 35 to 120 mg KOH/g, synthesized from adipic acid, ethylene glycol, and 1,4-butanediol; in each case having an NCO content in the range from 10 to 28 weight %; with a polyol, which preferably comprises and more preferably is a linear polyester diol having a hydroxyl number in the range from 35 to 120 mg KOH/g, synthesized from adipic acid, ethylene glycol, and 1,4-butanediol; and where the chain extender used comprises at least one linear aliphatic diol having 2 to 6 carbon atoms, more preferably at least 1,4-butanediol. Preferably after preliminary heating to temperatures in the range from 30 to 70° C., more preferably in the range from 40 to 60° C., polyol component and polyisocyanate component, preferably prepolymer are combined and then reacted in the form of a reactive mixture at a temperature in the range from 80 to 100° C. There is preferably a thermal aftertreatment for an interval of 24 to 48 hours at a temperature in the range from 80 to 100° C.

With the damping element as well, moreover, the metallic body comprises an iron alloy, preferably steel, or comprises aluminum. In one embodiment the metallic body comprises an iron alloy, preferably steel, and preferably consists to an extent of at least 99 weight % of steel, based on the total weight of metallic body. In a further embodiment the metallic body comprises aluminum, and preferably consists to an extent of at least 99 weight % of aluminum, based on the total weight of the metallic body. With regard to the shape there are likewise no restrictions in principle on the metallic body in the case of the damping element. The metallic body of the damping element preferably has a shape selected from the group consisting of disk, perforated disk, ring, cylinder, and hollow cylinder, where a hollow cylinder preferably also comprises a sleeve.

Further Body

The damping element comprises according to (2) at least one further body which is at least partly in direct contact with the composite element of (1), preferably with the plastics body of (c).

In one preferred embodiment the at least one further body comprises a metallic body, and preferably consists of a metallic body, with the metallic body preferably comprising an iron alloy, more preferably steel, or aluminum. This preferred embodiment of the damping element embraces, for example, round bearings which have an inner sleeve and an outer sleeve, with the inner sleeve then being disposed at least proportionally within the outer sleeve in the final round bearing, and with the plastics body of (c) then being located in the space between inner sleeve and outer sleeve. Preferably, in this embodiment, the inner sleeve, which represents the metallic body of (a), has a coating (b) comprising an epoxy resin on at least part of its outer surface; the outer surface of the inner sleeve in this case is the surface facing the outer sleeve. The coating (b) comprising an epoxy resin is located in this case at least on part of the outer surface of the inner sleeve, which on arrangement in the round bearing is disposed within the outer sleeve. Preferably, in this embodiment, the outer sleeve, which represents the further body of (2) and comprises a metallic body, and preferably is a metallic body, has the coating of (b') comprising an epoxy resin or at least part of its inner surface; the inner surface of the outer sleeve in this case is the surface facing the inner sleeve on arrangement in the round bearing. FIGS. 3 and 4 show, illustratively, a round bearing of this kind, and inner and outer sleeves.

Cellular Polyurethane of the Further Body

In an alternative preferred embodiment of the damping element, the at least one further body comprises a polyurethane, preferably a cellular polyurethane, preferably a cellular polyurethane having a density in the range from 200 to 1100 kg/m$^3$, more preferably a density in the range from 200 to 750 kg/m$^3$. More preferably in this embodiment the further body consists of the cellular polyurethane. This preferred embodiment of the damping element comprises, for example, damping elements for a damping bearing (top mount), as are shown illustratively in FIGS. 1 and 2. The metallic body of (a) of the damping element here preferably has an annular or perforated disk shape with a central hole. The further body of (2) preferably has the shape of a hollow cylinder or ring.

The cellular polyurethane of the further body of (2) is preferably obtained or obtainable by reacting at least the following components: isocyanate composition, isocyanate-reactive compound, water, and optionally polysiloxane composition, and optionally fatty acid sulfonates. Cellular polyurethanes (zP) of the kind used in the context of this invention are described in EP 1 379 588 B1 and EP 1 171 515 B1. They are obtained or obtainable by reaction of (zP.a) isocyanates with (zP.b) isocyanate-reactive compounds and also (d) water, with the (zP.b) used in one preferred embodiment being a polyester having 2 hydroxyl groups, based on the condensation of at least one dicarboxylic acid with 2-methylpropane-1,3-diol. The polyester having two hydroxyl groups may be prepared by processes of condensation which are common knowledge, typically at elevated temperature and reduced pressure in known apparatuses, preferably in the presence of customary catalysts. For example, the organic dicarboxylic acids and/or derivatives and polyhydric alcohols may be prepared by polycondensation, without catalyst or preferably in the presence of esterification catalysts, usefully in an atmosphere of inert gas, for example nitrogen, carbon monoxide, helium, argon, etc., in the melt at temperatures of 150 to 250° C., preferably 180 to 220° C., optionally under reduced pressure, down to the desired acid number, which is advantageously less than 10, preferably less than 2. In a preferred embodiment, the esterification mixture is polycondensed at the abovementioned temperatures down to an acid number of 80 to 30, preferably 40 to 30, under standard pressure and then under a pressure of less than 500 mbar, preferably 50 to 150 mbar. Examples of esterification catalysts that may be used are iron catalysts, cadmium catalysts, cobalt catalysts, lead catalysts, zinc catalysts, antimony catalysts, magnesium catalysts, titanium catalysts, and tin catalysts in the form of metals, metal oxides or metal salts. The polycondensation can, however, also be carried out in liquid phase in the presence of diluents and/or entraining agents, e.g. benzene, toluene, xylene or chlorobenzene, for azeotropic removal by distillation of the water of condensation.

To prepare the polyesters having 2 hydroxyl groups, the organic polycarboxylic acids and/or derivatives and diols are polycondensed preferably in a molar ratio of dicarboxylic acid to diol of 1:1.01 to 1:1.8, preferably 1:1.05 to 1:1. Dicarboxylic acids which can be used are aliphatic dicarboxylic acids that are common knowledge, such as succinic acid, glutaric acid, adipic acid, suberic acid, azelaic acid and sebacic acid, and/or aromatic dicarboxylic acids, such as phthalic acid, isophthalic acid and terephthalic acid. The dicarboxylic acids may be used individually or as mixtures. For preparation of the polyester polyols, it may optionally be advantageous, rather than the carboxylic acid, to use the corresponding carboxylic acid derivatives, such as carboxylic esters having 1 to 4 carbon atoms in the alcohol radical, carboxylic anhydrides or carbonyl chlorides. With particular preference, adipic acid is used for condensation with the diol mixture. The polyesters having 2 hydroxyl groups preferably have a molecular weight of 500 to 6000 g/mol, preferably 1000 to 3000 g/mol. The molecular weight is preferably the number average molecular weight. The cellular polyurethane is preferably obtained or obtainable by reacting the components (zP.a) isocyanate, (zP.b) isocyanate-reactive compound, (c) optionally chain extenders and/or crosslinking agents, (zP.d) water, and optionally (zP.e) catalysts, (zP.f) blowing agents and/or (zP.g) auxiliaries; in a one- or two-stage operation. Preferably, in a first stage, a prepolymer containing isocyanate groups is prepared, and in the second stage this prepolymer is reacted in a mold with a crosslinker component containing water (zP.d), where (zP.e) and optionally (zP.f) and/or (zP.g) may be present in the prepolymer and/or in the crosslinker component. The crosslinker component in this case may comprise a carbodiimide as (zP.g). As further components it is possible, as described in EP 1 171 515 B1, to add polysiloxanes and a maximum of 1 weight %, preferably 0 to 0.9 weight %, of sulfonated fatty acids, based on the weight of the cellular polyisocyanate polyaddition products. Polysiloxanes which can be used are compounds which are common knowledge, examples being polymethylsiloxanes, polydimethylsiloxanes and/or polyoxyalkylene-silicone copolymers; further details of the polysiloxanes used are described in EP 1 171 515 B1. Fatty acid sulfonates which can be used are sulfonated fatty acids which are common knowledge and also available commercially. Preferred for use as fatty acid sulfonate is sulfonated caster oil; details of this are described in EP 1 171 515 B1.

As isocyanates (zP.a) of the cellular polyurethane it is possible to use (cyclo)aliphatic and/or aromatic polyisocyanates which are common knowledge. Particularly suitable are aromatic diisocyanates, preferably diphenylmethane 2,2'-, 2,4'- and/or 4,4'-diisocyanate (MDI), naphthylene 1,5-diisocyanate (NDI), toluene 2,4- and/or 2,6-diisocyanate (TDI), dimethyldiphenyl 3,3'-diisocyanate, 1,2-diphenylethane diisocyanate, phenylene diisocyanate and/or (cyclo)

aliphatic isocyanates such as, for example, hexamethylene 1,6-diisocyanate, 1-isocyanato-3,3,5-trimethyl-5-isocyanatomethylcyclohexane and/or polyisocyanates such as polyphenylpolymethylene polyisocyanates, for example. The isocyanates can be used in the form of the pure compound, in mixtures and/or in modified form, as for example in the form of uretdiones, isocyanurates, allophanates or biurets, preferably in the form of reaction products containing urethane and isocyanate groups, referred to as isocyanate prepolymers. Preference is given to using optionally modified diphenylmethane 2,2'-, 2,4'- and/or 4,4'-diisocyanate (MDI), naphthylene 1,5-diisocyanate (NDI), toluene 2,4- and/or 2,6-diisocyanate (TDI) and/or mixtures of these isocyanates, more preferably optionally modified MDI or NDI or a mixture of MDI and NDI. Details of the isocyanates used and their deployment are described in EP 1 171 515 B1.

As isocyanate-reactive compounds (zP.b) it is possible to use polyhydroxyl compounds that are common knowledge, preferably those having a functionality of 2 to 3 and preferably a molecular weight of 60 to 6000, more preferably 500 to 6000, more particularly 800 to 3500. Used preferably as (zP.b) are polyether polyols, polyester polyalcohols and/or hydroxyl-containing polycarbonates. Preferred for use as (zP.b) are polyester polyalcohols, hereinafter also called polyester polyols. Suitable polyester polyols may be prepared, for example, from dicarboxylic acids having 2 to 12 carbon atoms, and dihydric alcohols. Contemplated dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids may be used individually or as mixtures. For preparation of the polyester polyols it may optionally be advantageous, rather than the carboxylic acid, to use the corresponding carboxylic acid derivatives, such as carboxylic esters having 1 to 4 carbon atoms in the alcohol radical, carboxylic anhydrides or carbonyl chlorides. Examples of dihydric alcohols are glycols having 2 to 16 carbon atoms, preferably 2 to 6 carbon atoms, such as, for example, ethylene glycol, diethylene glycol, butane-1,4-diol, pentane-1,5-diol, hexane-1,6-diol, decane-1,10-diol, 2-methylpropane-1,3-diol, 2,2-dimethylpropane-1,3-diol, propane-1,3-diol and dipropylene glycol. Depending on the desired properties, the dihydric alcohols may be used alone or optionally in mixtures with one another. Used preferably as polyester polyols are ethanediol polyadipates, 1,4-butanediol polyadipates, ethanediol butanediol polyadipates, 1,6-hexanediol neopentyl glycol polyadipates, 1,6-hexanediol 1,4-butanediol polyadipates, 2-methyl-1,3-propanediol 1,4-butanediol polyadipates and/or polycaprolactones, particular preference being given to 2-methyl-1,3-propanediol 1,4-butanediol polyadipates. Suitable ester-group-containing polyoxyalkylene glycols, substantially polyoxytetramethylene glycols, are polycondensates of organic, preferably aliphatic, dicarboxylic acids, especially adipic acid, with polyoxymethylene glycols with a number-average molecular weight of 162 to 600 and optionally aliphatic diols, especially butane-1,4-diol. Likewise suitable ester-group-containing polyoxytetramethylene glycols are those from the polycondensation of polycondensates formed with e-caprolactone. Suitable carbonate-group-containing polyoxyalkylene glycols, substantially polyoxytetramethylene glycols, are polycondensates thereof with alkyl and/or aryl carbonates or phosgene. Details of the isocyanate-reactive components employed and their deployment are described in EP 1 171 515 B1. Further to the isocyanate-reactive components already described, it is possible additionally to use low molecular weight chain extenders and/or crosslinking agents (zP.b1) having a molecular weight of less than 500, preferably 60 to 499, selected for example from the group of di- and/or trifunctional alcohols, di- to tetrafunctional polyoxyalkylene polyols, and alkyl-substituted aromatic diamines, or from mixtures of at least two of the stated chain extenders and/or crosslinking agents. As (zP.b1) it is possible for example to use alkanediols having 2 to 12, preferably 2, 4 or 6, carbon atoms, e.g., ethane-, 1,3-propane-, 1,5-pentane-, 1,6-hexane-, 1,7-heptane-, 1,8-octane-, 1,9-nonane-, and 1,10-decanediol, and preferably 1,4-butanediol, dialkylene glycols having 4 to 8 carbon atoms, such as diethylene glycol and dipropylene glycol, and/or polyoxyalkylene polyols having a functionality of two to four. Further details of the low molecular weight chain extenders and/or crosslinking agents (zP.b1) are described in EP 1 171 515 B1, which is also the source of the details for the (zP.e) catalysts, (zP.f) blowing agents and/or (zP.g) auxiliaries.

In one preferred embodiment the cellular polyurethane of the further body of (2) is preferably obtained or obtainable by reacting at least the following components: isocyanate composition, which comprises at least MDI or NDI or a mixture of MDI and NDI; isocyanate-reactive compound which comprises at least one polyester having 2 hydroxyl groups, based on the condensation of at least one dicarboxylic acid, preferably adipic acid, with at least 2-methylpropane-1,3-diol and optionally at least one further diol, preferably 1,4-butanediol; water, and optionally polysiloxane composition and optionally fatty acid sulfonates.

With regard to the water (zP.d), the amounts of water usefully used are 0.01 to 5 weight %, preferably 0.3 to 3.0 weight %, based on the weight of the component (zP.b). The water may be used entirely or partly in the form of the aqueous solutions of the sulfonated fatty acids. To accelerate the reaction, both during the preparation of a prepolymer and, optionally, during the reaction of a prepolymer with a crosslinker component, catalysts (f) which are common knowledge may be added to the reaction mixture. The catalysts (zP.f) may be added individually and also in a blend with one another. They are preferably organometallic compounds, such as tin(II) salts of organic carboxylic acids, e.g., tin(II) dioctoate, tin(II) dilaurate, dibutyltin diacetate and dibutyltin dilaurate and tertiary amines such as tetramethylethylenediamine, N-methylmorpholine, diethylbenzylamine, triethylamine, dimethylcyclohexylamine, diazabicyclooctane, N,N'-dimethylpiperazine, N-methyl, N'-(4-N-dimethylamino)butylpiperazine, N, N, N',N", N"-pentamethyl-diethylenetriamine or the like. Additionally contemplated as catalysts are the following: Amidines, such as, for example, 2,3-dimethyl-3,4,5,6-tetrahydropyrimidine, tris(dialkylaminoalkyl)-s-hexahydrotriazines, especially tris (N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, for example, and also alkali metal salts of long-chain fatty acids having 10 to 20 carbon atoms and optionally pendent OH groups. Depending on the reactivity that is to be set, the catalysts (zP.f) are employed in amounts of 0.001 to 0.5 weight %, based on the prepolymer. Blowing agents (zP.g) customary within polyurethane production may optionally be used. Suitable examples include low-boiling liquids which evaporate under the effect of the exothermic polyaddition reaction. Suitable liquids are those which are inert to the organic polyisocyanate and have boiling points below 100° C. Examples of liquids of this kind that are preferably used are halogenated, preferably fluorinated, hydrocarbons, such as methylene chloride and dichloromonofluoromethane, perfluorinated or partly fluorinated hydrocarbons, such as trifluoromethane, difluoromethane, difluoroethane, tetrafluoroethane and heptafluoropropane, hydrocarbons, such as n- and isobutane, n- and isopentane and also the technical mixtures of these hydrocarbons, propane, propylene, hexane, heptane, cyclobutane, cyclopentane and cyclohexane, dialkyl ethers, such as dimethyl ether, diethyl ether and furan, carboxylic esters, such as methyl and ethyl formates, ketones, such as acetone, and/or fluorinated and/or perfluorinated tertiary alkylamines, such as perfluorodimethylisopropylamine, for example. It is also possible to use mixtures of these low-boiling-point liquids with one another and/or with other substituted or unsubstituted hydrocarbons. The most useful amount of low-boiling liquid for the preparation of cellular polyurethanes of this kind is dependent on the desired density and also on the amount of the water preferably used as well. Generally speaking, satisfactory results are obtained with amounts of 1 to 15 weight %, preferably 2 to 11 weight %, based on the weight of component (zP.b). More preferably, water (zP.e) exclusively is used as blowing agent. Details of other auxiliaries (zP.h) used can be found in EP 1 171 515 B1, especially in paragraph [0060].

According to one preferred embodiment of a damping element, the element, between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide. Preferred embodiments of this have been described above already for the composite element; they are valid analogously here.

Production Process—Composite Element

The present invention also relates to a process for producing a composite element, wherein the composite element comprises
  a) at least one metallic body having a surface;
  b) a coating comprising an epoxy resin on at least part of the surface of the metallic body;
  c) a plastics body comprising at least one polyurethane, which at least partly surrounds the metallic body of (a) and in the region of the surround is at least partly in direct contact with the coating of (b); comprising
  I) providing at least one metallic body having a surface and a coating comprising an epoxy resin on at least part of the surface of the metallic body;
  II) embedding the coated metallic body of (I) into a plastics composition comprising at least one polyurethane, wherein the coated metallic body is at least partly surrounded by the plastics composition and the latter in the region of the surround enters at least partly into direct contact with the coating of (b).

The coating of (b) is preferably present directly on the surface of the metallic body (a), i.e., the metallic body on its surface has no corrosion control coating, as for example no iron coating (ZnFe) or zinc-nickel coating (ZnNi). The coating comprising an epoxy resin of (b) is therefore applied directly on at least part of the surface of the metallic body of (a). As far as the individual constituents are concerned, the description already given above for the composite element itself is valid equally for the process for producing the composite element.

In one preferred embodiment of the process for producing a composite element, the composite element, between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide; and respectively, according to (I), at least one metallic body having a surface and a coating comprising an epoxy resin on at least part of the surface of the metallic body is provided, there being, between the surface of the metallic body (a) and the coating (b), a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide. Preferred embodiments in this regard have already been described above for the composite element; they are valid here analogously.

The invention also relates to a composite element obtained or obtainable by the process described above.

Production Process—Damping Element

The invention further relates to a process for producing a damping element comprising
  (1) a composite element comprising
    a) at least one metallic body having a surface;
    b) a coating comprising an epoxy resin on at least part of the surface of the metallic body;
    c) a plastics body comprising at least one polyurethane, which at least partly surrounds the metallic body of (a) and in the region of the surround is at least partly in direct contact with the coating of (b);
  (2) at least one further body which is at least partly in direct contact with the composite element of (1), preferably with the plastics body of (c); comprising
  III) providing a composite element (1) and at least one further body (2);
  IV) at least proportionally contacting and optionally connecting composite element (1) and the at least one further body (2) via an outer face of the composite element (1) and an outer face of the at least one further body (2).

In one preferred embodiment of the process for producing a damping element, the further body has a coating comprising an epoxy resin on at least part of its surface, the epoxy resin being preferably obtained or obtainable from a water-containing epoxy resin dispersion which has preferably more than 50 weight % of water, based on the total weight of the water-containing epoxy resin dispersion.

The coating of (b) is preferably present directly on the surface of the metallic body (a), i.e., the metallic body on its surface has no corrosion control coating, as for example no iron coating (ZnFe) or zinc-nickel coating (ZnNi). The coating comprising an epoxy resin of (b) is therefore applied directly on at least part of the surface of the metallic body of (a).

As far as the individual constituents are concerned, the description already given above for the composite element itself is valid equally for the process for producing the damping element.

In one preferred embodiment of the process for producing a damping element, the composite element (1), between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide; and/or, preferably and, the further body, between its surface and the coating comprising an epoxy resin, has a conversion coating which comprises at least one compound selected from the group of zirconium(IV) oxide, zinc(II) phosphate, and chromate, preferably at least zirconium(IV) oxide and/or zinc phosphate, more preferably at least zirconium(IV) oxide. Preferred embodiments in this regard have already been described above for the composite element; they are valid here analogously.

One preferred embodiment of the process for producing a damping element comprising
  (1) a composite element comprising
    a) at least one metallic body having a surface;
    b) a coating comprising an epoxy resin on at least part of the surface of the metallic body;
    c) a plastics body comprising at least one polyurethane, which at least partly surrounds the metallic body of (a) and in the region of the surround is at least partly in direct contact with the coating of (b);
  (2) at least one further body which is at least partly in direct contact with the composite element of (1), preferably with the plastics body of (c); comprises:
    II.1) introducing the metallic body having a surface and a coating comprising an epoxy resin on at least one part of the surface of the metallic body into a mold, preferably a casting mold,
    II.2) introducing the further body into the mold, preferably into the casting mold, with a part of the mold, preferably between metallic body of (II.1) and further body, remaining empty;
    II.3) introducing the plastics composition into the part of the mold from (II.2) that has remained empty.

In one preferred embodiment of the process for producing a damping element, (II.1) comprises:
  II.1.1) providing at least one metallic body having a surface;
  II.1.2) applying a coating comprising an epoxy resin to at least part of the surface of the metallic body, preferably by means of a process selected from the group consisting of spraying and surface coating, preferably deposition coating, more preferably by means of cathodic deposition coating,
to give a metallic body having a surface and a coating comprising an epoxy resin on at least part of a surface of the metallic body.

Preferably in this case the coating of (b) is applied directly on the surface of the metallic body (a), i.e., the metallic body on its surface has no corrosion control coating, as for example no iron coating (ZnFe) or zinc-nickel coating (ZnNi). The applying of II.1.2) therefore takes place directly on the surface of the metallic body of (a), and more preferably there is also no further coating step performed between II.1.1) and II.1.2). As far as the individual constituents are concerned, the description already given for the composite element itself is valid equally for the process.

According to one preferred embodiment of the process for producing a damping element, the composite element (1), between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide; and/or wherein (II.1.2) comprises:
  II.1.2.1) applying a coating on at least part of the surface of the metallic body, which comprises at least one compound selected from the group of zirconium(IV) oxide, zinc(II) phosphate, and chromate, preferably at least zirconium(IV) oxide and/or zinc phosphate, more preferably at least zirconium(IV) oxide, to give a conversion coating on at least part of the surface of the metallic body;
  II.1.2.2) applying a coating comprising an epoxy resin on at least part of the conversion coating obtained in (II.1.2.1), by means of a process selected from the group consisting of spraying and surface coating, preferably deposition coating, more preferably by means of cathodic deposition coating.

In one preferred embodiment of the process for producing a damping element, the further body has a coating comprising an epoxy resin on at least part of its surface, wherein (II.2) preferably comprises:
  II.2.1) providing at least one further body having a surface, preferably at least one further body comprising an iron alloy or aluminum;
  II.2.2) applying a coating comprising an epoxy resin to at least part of the surface of the further body, preferably by means of a process selected from the group consisting of spraying and surface coating, more preferably deposition coating, more preferably by means of cathodic deposition coating,
to give a further body having a surface and a coating comprising an epoxy resin on at least part of its surface; where preferably the further body, between its surface and the coating comprising an epoxy resin, has a conversion coating which comprises at least one compound selected from the group of zirconium(IV) oxide, zinc(II) phosphate, and chromate, preferably at least zirconium(IV) and/or zinc phosphate, more preferably at least zirconium(IV) oxide.

Preferably in this case the coating of (b) is applied directly on the surface of the further body, i.e., the further body on its surface has no corrosion control coating, as for example no iron coating (ZnFe) or zinc-nickel coating (ZnNi). The applying of II.2.2) therefore takes place directly on the surface of the further body, and more preferably there is also no further coating step performed between II.2.1) and II.2.2). As far as the individual constituents are concerned, the description already given above for the composite element itself is valid equally for the process.

The epoxy resin used in (II.1.2) and, respectively, in (II.2.2) preferably comprises an epoxy resin which is preferably obtained or obtainable from a water-containing epoxy resin dispersion which has preferably more than 50 weight % of water, based on the total weight of the water-containing epoxy resin dispersion. The epoxy resin dispersion which comprises an epoxy resin having ammonium groups is preferably obtained or obtainable by
  A) reacting at least the components
    i) a precursor prepared or preparable, with addition of phosphines and/or phosphine salts as catalyst, from
      i.a) at least one diepoxide compound;
      i.b) at least one mono- or diphenol or a mixture of a mono- and a diphenol;
    ii) at least one organic amine;
      at an addition temperature in the range from 60 to 130° C. to give an epoxide-amine adduct;
  B) subsequently or simultaneously reacting the secondary hydroxyl groups, formed in the reaction of components i.a) and i.b), with epoxide groups of the epoxide-amine adduct prepared in stage A), at a temperature of 110 to 150° C.,
  C) adding at least one crosslinking agent at a temperature of <150° C.,
  D) neutralizing;
  E) dispersing the mixture obtained in stages A) to D) in water.

The epoxy resin dispersion comprising an epoxy resin containing ammonium groups, and the epoxy resin, are the same as already described above for the epoxy resin dispersion for the composite element; in other words, for the application of the coating on the metallic body of (c) and for the coating according to (II.1.2) or (II.2.2) in the context of the damping element, the epoxy resin/water-containing epoxy resin dispersion used is the same as that already described above in relation to the composite element, particularly in the section "Epoxy resin of (b)" there.

For the application of the coating on the metallic body of (c) and, respectively, for the coating according to (II.1.2) and (II.2.2) in the context of the damping element, preference is given to employing cathodic deposition coating, in which case the applied voltage is preferably in the range from 50 to 500 volts, more preferably in the range from 100 to 400 volts, more preferably in the range from 200 to 350 volts. The coating time in the case of the cathodic deposition coating for the application of the coating on the metallic body of (c) and, respectively, the coating according to (II.1.2) and (II.2.2) in the context of the damping element, is preferably in the range from 50 to 500 seconds, more preferably in the range from 100 to 300 seconds, more preferably in the range from 120 to 240 seconds. The anode/cathode ratio in the case of the cathodic deposition coating for the application of the coating on the metallic body of (c) and, respectively, the coating according to (II.1.2) and (II.2.2) in the context of the damping element, is preferably in the range from 1:10 to 10:1, more preferably in the range from 1:6 to 1:4.

The coating on the metallic body of (c) or the coating obtained according to (II.1.2) and (II.2.2) preferably has a layer thickness in the range from 1 to 100 micrometers, more preferably in the range from 5 to 60 micrometers, more preferably in the range from 10 to 50 micrometers, more preferably in the range from 20 to 40 micrometers, determined according to DIN EN ISO 2808. The coating on the metallic body of (c) or the coating obtained according to (II.1.2) and (II.2.2) has a dry film density in the range from 0.5 to 5 g/cm$^3$, preferably in the range from 1 to 2.5 g/cm$^3$, more preferably in the range from 1.1 to 2.0 g/cm$^3$, more preferably in the range from 1.3 to 1.4 g/cm$^3$ determined according to DIN 53219.

In one preferred embodiment of the process for producing a damping element, the introducing of the plastics composition according to (II.3) comprises:

II.3.1) providing a first component of the plastics composition, preferably a polyisocyanate composition, preferably an isocyanate-terminated prepolymer of the plastics composition;

II.3.2) providing a second component of the plastics composition, preferably the polyol composition of the plastics composition, more preferably the remaining polyol composition of the plastics composition;

II.3.3) mixing the first and second components of the plastic composition; to give a reactive mixture of the plastics composition;

II.3.4) introducing the reactive mixture according to (II.3.3) into that part of the mold from (II.2) that has remained empty.

For the plastics composition, the description valid is the same as already described above for the composite element under "Polyurethane of the plastics body of (c)"; in particular, the individual components are as already described there for the production of the damping element.

In one preferred embodiment of the process for producing a damping element, the first component of the plastics composition according to II.3.1), more particularly the isocyanate-terminated prepolymer (iii.a) of the plastics composition according to II.3.1), is obtained or obtainable from the reaction of a polyisocyanate composition (iii) with a part of the polyol composition (iv), where the remaining part of the polyol composition (iv.a) is provided as second component of the plastics composition according to II.3.2). Isocyanate-terminated prepolymer (iii.a) and remaining part of the polyol composition (iv.a) are then mixed, optionally in the presence of a chain extender composition (v), to give a reactive mixture of the plastics composition according to II.3). This reactive mixture according to (II.3.3) is then introduced into that part of the mold from (II.2) that has remained empty, where it is reacted. First and second components of the plastics composition are preferably combined after heating to temperatures in the range from 30 to 70° C., more preferably in the range from 40 to 60° C. The reactive mixture is reacted in the mold preferably at a temperature in the range from 80 to 100° C. There is preferably a thermal aftertreatment for an interval of 24 to 48 hours at a temperature in the range from 80 to 100° C.

The at least one polyurethane of the plastics body of (c) is preferably a polyurethane casting elastomer or a polyurethane foam, more preferably a polyurethane casting elastomer.

In one particularly preferred embodiment, the polyurethane of the plastics body of (c) is a polyurethane casting elastomer which is obtained or obtainable by reacting a prepolymer (iii.a) based on diphenylmethane 4,4'-diisocyanate, carbodiimide-modified 4,4'-MDI, linear polyester diol having a hydroxyl number in the range from 35 to 120 mg KOH/g, synthesized from adipic acid, ethylene glycol, and 1,4-butanediol, and/or a branched polyester diol having a hydroxyl number in the range from 35 to 120 mg KOH/g, synthesized from adipic acid, ethylene glycol, and 1,4-butanediol; in each case having an NCO content in the range from 10 to 28 weight %; with a polyol (iv.a), which preferably comprises and more preferably is a linear polyester diol having an hydroxyl number in the range from 35 to 120 mg KOH/g, synthesized from adipic acid, ethylene glycol, and 1,4-butanediol; and where the chain extender used comprises at least one linear aliphatic diol having 2 to 6 carbon atoms, more preferably at least 1,4-butanediol. Preferably after preliminary heating to temperatures in the range from 30 to 70° C., more preferably in the range from 40 to 60° C., polyol component and isocyanate component, preferably prepolymer are combined and then reacted in the form of a reactive mixture at a temperature in the range from 80 to 100° C. There is preferably a thermal aftertreatment for an interval of 24 to 48 hours at a temperature in the range from 80 to 100° C.

According to II.2), a further body is introduced into the mold, preferably into the casting mold, with a part of the mold remaining empty, preferably between metallic body according to (II.1) and further body. For the further body, the preferred embodiments that are valid are the same as those already described above for the damping element itself; in other words, in one preferred embodiment, the at least one further body comprises a metallic body, and preferably consists of a metallic body, with the metallic body preferably comprising an iron alloy, more preferably steel, or aluminum, and more preferably consisting of steel or aluminum to an extent of at least 99 weight %, based on the total weight of the further body. In a further preferred embodiment, the further body comprises a polyurethane, more preferably a cellular polyurethane. The cellular polyurethane of the further body is subject to the same description, with regard to the production process for the damping element, as that already given above for the damping element, particularly in the section "Cellular polyurethane of the further body" for the damping element.

The invention likewise relates to a damping element obtained or obtainable by the process described above.

The invention also relates to the use of a composite element as described above or of a damping element as described above for a motor vehicle component, more particularly an automobile component, an aircraft component or a nautical component, preferably for an automobile component.

The present invention is illustrated in more detail by the following embodiments and combinations of embodiments, which are apparent from the corresponding dependency references and other references. In particular, it should be noted that in every case where a range of embodiments is mentioned, for example in the context of an expression such as "the process according to any of embodiments 1 to 4", each embodiment in this range is deemed to be explicitly disclosed to those skilled in the art, i.e. the wording of this expression is to be understood by those skilled in the art as synonymous with "the process according to any of embodiments 1, 2, 3, and 4".

1. A composite element, especially for a damping element, comprising
   a) at least one metallic body having a surface;
   b) a coating comprising an epoxy resin on at least part of the surface of the metallic body;
   c) a plastics body comprising at least one polyurethane, which at least partly surrounds the metallic body of (a) and in the region of the surround is at least partly in direct contact with the coating of (b).

2. The composite element according to embodiment 1, wherein the coating comprising an epoxy resin of (b) is applied or applicable to at least part of the surface of the metallic body of (a) by means of a method selected from the group consisting of spraying and surface coating, preferably surface coating, more preferably deposition coating, more preferably cathodic deposition coating.

3. The composite element according to embodiment 1 or 2, wherein the epoxy resin of (b) is an epoxy resin which is preferably obtained or obtainable from a water-containing epoxy resin dispersion which has preferably more than 50 weight % of water, based on the total weight of the water-containing epoxy resin dispersion.

4. The composite element according to embodiment 3, wherein the epoxy resin dispersion comprises an epoxy resin having ammonium groups, obtained or obtainable by
   A) reacting at least the components
      i) a precursor prepared or preparable, with addition of phosphines and/or phosphine salts as catalyst, from
         i.a) at least one diepoxide compound;
         i.b) at least one mono- or diphenol or a mixture of a mono- and a diphenol;
      ii) at least one organic amine;
      at an addition temperature in the range from 60 to 130° C. to give an epoxide-amine adduct;
   B) subsequently or simultaneously reacting the secondary hydroxyl groups, formed in the reaction of components i.a) and i.b), with epoxide groups of the epoxide-amine adduct prepared in stage A), at a temperature of 110 to 150° C.,
   C) adding at least one crosslinking agent at a temperature of <150° C.,
   D) neutralizing;
   E) dispersing the mixture obtained in stages A) to D) in water.

5. The composite element according to any of embodiments 1 to 4, wherein the coating of (b) has a layer thickness in the range from 1 to 100 micrometers, preferably in the range from 5 to 60 micrometers, more preferably in the range from 10 to 50 micrometers, more preferably in the range from 20 to 40 micrometers, determined according to DIN EN ISO 2808.

6. The composite element according to any of embodiments 1 to 5, wherein the coating of (b) has a dry film density in the range from 0.5 to 5 g/cm$^3$, preferably in the range from 1 to 2.5 g/cm$^3$, more preferably in the range from 1.1 to 2.0 g/cm$^3$, more preferably in the range from 1.3 to 1.4 g/cm$^3$ determined according to DIN 53219.

7. The composite element according to any of embodiments 1 to 6, wherein the at least one polyurethane of the plastics body of (c) is obtained or obtainable by reacting at least the components
   (iii) a polyisocyanate composition;
   (iv) a polyol composition;
   (v) optionally a chain extender composition.

8. The composite element according to embodiment 7, wherein the polyisocyanate composition of (iii) comprises at least one polyisocyanate selected from the diisocyanates, preferably selected from the group consisting of naphthalene 1,5-diisocyanate (1,5-NDI), 3,3'-dimethylbiphenyl-4,4'-diyl diisocyanate (TODI), diphenylmethane 2,2'-diisocyanate (2,2'-MDI), diphenylmethane 2,4' diisocyanate (2,4'-MDI), diphenylmethane 4,4'-diisocyanate (4,4'-MDI), carbodiimide-modified 4,4'-MDI, hexamethylene 1,6-diisocyanate (HDI), and methylenedicyclohexyl 4,4'-, 2,4', and 2,2'-diisocyanate (H12MDI), and higher polycyclic homologs of methanediphenyl diisocyanate (polymeric MDI), more preferably at least 4,4'-MDI or carbodiimide-modified 4,4'-MDI, or a mixture of 4,4'-MDI and carbodiimide-modified 4,4'-MDI.

9. The composite element according to embodiment 7 or 8, wherein the polyol composition of (iv) comprises at least one polyester polyol, polyether polyol or polyetherester polyol, preferably selected from the group of di- to hexafunctional polyester polyols and polyether polyols, preferably from the group of the di- and trifunctional polyester polyols, preferably from the group of the di- and trifunctional adipic esters.

10. The composite element according to any of embodiments 7 to 9, wherein the chain extender composition of (iv) comprises at least one compound which has at least two isocyanate-reactive functional groups, preferably two isocyanate-reactive functional groups, with the isocyanate-reactive functional groups being preferably selected from the group of hydroxyl group, amino group, and thiol group, and the at least one compound which has isocyanate-reactive functional groups is more preferably selected from the group consisting of monoethylene glycol, 1,4-butanediol, diethylene glycol, glycerol, trimethylolpropane, and 2,4-diamino-3,5-di(methylthio)toluene, and more preferably comprises at least 1,4-butanediol.

11. The composite element according to any of embodiments 7 to 10, wherein the polyisocyanate composition (iii) is present in the form of an isocyanate-terminated prepolymer
(iii.a), obtained or obtainable from the reaction of polyisocyanate composition (iii) with a part of the polyol composition (iv), and the polyurethane is obtained or obtainable by reacting at least the components
(iii.a) isocyanate-terminated prepolymer;
(iv.a) remaining part of the polyol composition (iv);
(v) optionally chain extender composition.

12. The composite element according to any of embodiments 7 to 11, wherein the at least one polyurethane of the plastics body of (c) is a polyurethane casting elastomer or a polyurethane foam, preferably a polyurethane casting elastomer.

13. The composite element according to any of embodiments 1 to 12, wherein the metallic body comprises an iron alloy, preferably steel, or aluminum.

14. The composite element according to any of embodiments 1 to 13, wherein the metallic body has a shape selected from the group consisting of disk, perforated disk, ring, cylinder, and hollow cylinder, where a hollow cylinder preferably also comprises a sleeve.

15. The composite element according to any of embodiments 1 to 14, comprising, between the surface of the metallic body (a) and the coating (b), a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide.

16. A damping element comprising
(1) a composite element comprising
a) a metallic body having a surface;
b) a coating comprising an epoxy resin on at least part of the surface of the metallic body;
c) a plastics body comprising at least one polyurethane, which at least partly surrounds the metallic body of (a) and in the region of the surround is at least partly in direct contact with the coating of (b);
(2) at least one further body which is at least partly in direct contact with the composite element of (1), preferably with the plastics body of (c).

17. The damping element according to embodiment 16, wherein the at least one further body has a coating (b') comprising an epoxy resin on at least part of its surface.

18. The damping element according to embodiment 16 or 17, wherein the coating comprising an epoxy resin of (b) or (b') on at least part of the surface of the metallic body of (a) or on at least part of the surface of the at least one further body, respectively, is applied or applicable by means of a method selected from the group consisting of spraying and surface coating, preferably surface coating, more preferably deposition coating, more preferably cathodic deposition coating.

19. The damping element according to any of embodiments 16 to 18, wherein the epoxy resin of (b) or (b') comprises an epoxy resin which is preferably obtained or obtainable from a water-containing epoxy resin dispersion, which has preferably more than 50 weight % of water, based on the total weight of the water-containing epoxy resin dispersion.

20. The damping element according to any of embodiments 16 to 19, wherein the epoxy resin dispersion comprises an epoxy resin having ammonium groups, obtained or obtainable by
A) reacting at least the components
i) a precursor prepared or preparable, with addition of phosphines and/or phosphine salts as catalyst, from
i.a) at least one diepoxide compound;
i.b) at least one mono- or diphenol or a mixture of a mono- and a diphenol;
ii) at least one organic amine;
at an addition temperature in the range from 60 to 130° C. to give an epoxide-amine adduct;
B) subsequently or simultaneously reacting the secondary hydroxyl groups, formed in the reaction of components i.a) and i.b), with epoxide groups of the epoxide-amine adduct prepared in stage A), at a temperature of 110 to 150° C.,
C) adding at least one crosslinking agent at a temperature of <150° C.,
D) neutralizing;
E) dispersing the mixture obtained in stages A) to D) in water.

21. The damping element according to any of embodiments 16 to 20, wherein the coating of (b) or (b') has a layer thickness in the range from 1 to 100 micrometers, preferably in the range from 5 to 60 micrometers, more preferably in the range from 10 to 50 micrometers, more preferably in the range from 20 to 40 micrometers, determined according to DIN EN ISO 2808.

22. The damping element according to any of embodiments 16 to 21, wherein the coating of (b) or (b') has a dry film density in the range from 0.5 to 5 $g/cm^3$, preferably in the range from 1 to 2.5 $g/cm^3$, more preferably in the range from 1.1 to 2.0 $g/cm^3$, more preferably in the range from 1.3 to 1.4 $g/cm^3$, determined according to DIN 53219.

23. The damping element according to any of embodiments 16 to 22, wherein the at least one polyurethane of the plastics body of (c) is obtained or obtainable by reacting at least the components:
(iii) a polyisocyanate composition;
(iv) a polyol composition;
(v) optionally a chain extender composition.

24. The damping element according to embodiment 23, wherein the polyisocyanate composition of (iii) comprises at least one polyisocyanate selected from the diisocyanates, preferably selected from the group consisting of naphthalene 1,5-diisocyanate (1,5-NDI), 3,3'-dimethylbiphenyl-4,4'-diyl diisocyanate (TODI), diphenylmethane 2,2'-diisocyanate (2,2'-MDI), diphenylmethane 2,4'-diisocyanate (2,4'-MDI), diphenylmethane 4,4'-diisocyanate (4,4'-MDI), carbodiimide-modified 4,4'-MDI, hexamethylene 1,6-diisocyanate (HDI), and methylenedicyclohexyl 4,4'-, 2,4', and 2,2'-diisocyanate (H12MDI), and higher polycyclic homologs of methanediphenyl diisocyanate (polymeric MDI), more preferably at least 4,4'-MDI or carbodiimide-modified 4,4'-MDI, or a mixture of 4,4'-MDI and carbodiimide-modified 4,4'-MDI.

25. The damping element according to embodiment 23 or 24, wherein the polyol composition of (iv) comprises at least one polyester polyol, polyether polyol or polyetherester polyol, preferably selected from the group of di- to hexafunctional polyester polyols and polyether polyols, preferably from the group of the diand trifunctional polyester polyols, preferably from the group of the di- and trifunctional adipic esters.

26. The damping element according to any of embodiments 23 to 25, wherein the chain extender composition of (iv) comprises at least one compound which has at least two isocyanate-reactive functional groups, preferably two isocyanate-reactive functional groups, with the isocyanate-reactive functional groups being preferably selected from the group of hydroxyl group, amino group, and thiol group, and the at least one compound which has isocyanate-reactive functional groups is more preferably selected from the group consisting of monoethylene glycol, 1,4-butanediol, diethylene glycol, glycerol, trimethylolpropane, and 2,4-diamino-3,5-di(methylthio)toluene, and more preferably comprises at least 1,4-butanediol.

27. The damping element according to any of embodiments 23 to 26, wherein the polyisocyanate composition (iii) is present in the form of an isocyanate-terminated prepolymer (iii.a), obtained or obtainable from the reaction of polyisocyanate composition (iii) with a part of the polyol composition (iv), and the polyurethane is obtained or obtainable by reacting at least the components
(iii.a) isocyanate-terminated prepolymer;
(iv.a) remaining part of the polyol composition (iv);
(v) optionally chain extender composition.

28. The damping element according to any of embodiments 23 to 27, wherein the at least one polyurethane of the plastics body of (c) is a polyurethane casting elastomer or a polyurethane foam, preferably a polyurethane casting elastomer.

29. The damping element according to any of embodiments 16 to 27, wherein the metallic body comprises an iron alloy, preferably steel, or aluminum.

30. The damping element according to any of embodiments 16 to 29, wherein the metallic body has a shape selected from the group consisting of disk, perforated disk, ring, cylinder, and hollow cylinder, where a hollow cylinder preferably also comprises a sleeve.

31. The damping element according to any of embodiments 16 to 30, wherein the at least one further body comprises a metallic body, preferably consists of a metallic body, where the metallic body preferably comprises an iron alloy, more preferably steel, or aluminum.

32. The damping element according to any of embodiments 16 to 31, wherein the at least one further body comprises a polyurethane, preferably a cellular polyurethane, preferably a cellular polyurethane having a density in the range from 200 to 1100 kg/m$^3$, more preferably a density in the range from 200 to 750 kg/m$^3$.

33. The damping element according to embodiment 32, wherein the cellular polyurethane is obtained or obtainable by reacting at least the following components: isocyanate composition, isocyanate-reactive compound, water, and optionally polysiloxane composition, and optionally fatty acid sulfonates.

34. The damping element according to any of embodiments 16 to 33, comprising, between the surface of the metallic body (a) and the coating (b), a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide.

35. A process for producing a composite element, wherein the composite element comprises
a) at least one metallic body having a surface;
b) a coating comprising an epoxy resin on at least part of the surface of the metallic body;
c) a plastics body comprising at least one polyurethane, which at least partly surrounds the metallic body of (a) and in the region of the surround is at least partly in direct contact with the coating of (b);
comprising
I) providing at least one metallic body having a surface and a coating comprising an epoxy resin on at least part of the surface of the metallic body;
II) embedding the coated metallic body of (I) into a plastics composition comprising at least one polyurethane, wherein the coated metallic body is at least partly surrounded by the plastics composition and the latter in the region of the surround enters at least partly into direct contact with the coating of (b).

36. A process for producing a composite element according to embodiment 35, wherein the composite element, between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide; and respectively, according to (I), at least one metallic body having a surface and a coating comprising an epoxy resin on at least part of the surface of the metallic body is provided, there being, between the surface of the metallic body (a) and the coating (b), a conversion layer (d) which comprises at least one compound selected from the group of zirconium(IV) oxide, zinc(II) phosphate, and chromate, preferably at least zirconium(IV) oxide and/or zinc phosphate, more preferably at least zirconium(IV) oxide.

37. A composite element obtained or obtainable for the process according to embodiment 35 or 36.

38. A process for producing a damping element comprising
(1) a composite element comprising
a) at least one metallic body having a surface;
b) a coating comprising an epoxy resin on at least part of the surface of the metallic body;
c) a plastics body comprising at least one polyurethane, which at least partly surrounds the metallic body of (a) and in the region of the surround is at least partly in direct contact with the coating of (b);
(2) at least one further body which is at least partly in direct contact with the composite element of (1), preferably with the plastics body of (c);
comprising
III) providing a composite element (1) and at least one further body (2);
IV) at least proportionally contacting and optionally connecting composite element (1) and the at least one further body (2) via an outer face of the composite element (1) and an outer face of the at least one further body (2).

39. The process for producing a damping element according to embodiment 38, wherein the further body has a coating comprising an epoxy resin on at least part of its surface, the epoxy resin being preferably obtained or obtainable from a water-containing epoxy resin dispersion which has preferably more than 50 weight % of water, based on the total weight of the water-containing epoxy resin dispersion.
40. The process for producing a damping element according to embodiment 38 or 39, wherein the composite element (1), between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium (IV) oxide; and/or, preferably and, the further body, between its surface and the coating comprising an epoxy resin, has a conversion coating which comprises at least one compound selected from the group of zirconium(IV) oxide, zinc(II) phosphate, and chromate, preferably at least zirconium(IV) oxide and/or zinc phosphate, more preferably at least zirconium(IV) oxide.
41. A process for producing a damping element comprising
  (1) a composite element comprising
    a) at least one metallic body having a surface;
    b) a coating comprising an epoxy resin on at least part of the surface of the metallic body;
    c) a plastics body comprising at least one polyurethane, which at least partly surrounds the metallic body of (a) and in the region of the surround is at least partly in direct contact with the coating of (b);
  (2) at least one further body which is at least partly in direct contact with the composite element of (1), preferably with the plastics body of (c);
comprising
  II.1) introducing the metallic body having a surface and a coating comprising an epoxy resin on at least one part of the surface of the metallic body into a mold, preferably a casting mold,
  II.2) introducing the further body into the mold, preferably into the casting mold, with a part of the mold, preferably between metallic body of (II.1) and further body, remaining empty;
  II.3) introducing the plastics composition into the part of the mold from (II.2) that has remained empty.
42. The process for producing a damping element according to embodiment 41, wherein (II.1) comprises
  II.1.1) providing at least one metallic body having a surface;
  II.1.2) applying a coating comprising an epoxy resin to at least part of the surface of the metallic body by means of a process selected from the group consisting of spraying and surface coating, preferably deposition coating, more preferably by means of cathodic deposition coating,
  to give a metallic body having a surface and a coating comprising an epoxy resin on at least part of a surface of the metallic body.
43 The process for producing a damping element according to embodiment 41 or 42, wherein the composite element (1), between the surface of the metallic body (a) and the coating (b), has a conversion layer (d) which comprises at least one compound selected from the group of zirconium(IV) oxide, zinc(II) phosphate, and chromate, preferably at least zirconium(IV) oxide and/or zinc phosphate, more preferably at least zirconium (IV) oxide; and/or wherein (II. 1.2) comprises: II.1.2.1) applying a coating on at least part of the surface of the metallic body, which comprises at least one compound selected from the group of zirconium(IV) oxide, zinc(II) phosphate, and chromate, preferably at least zirconium(IV) oxide and/or zinc phosphate, more preferably at least zirconium(IV) oxide, to give a conversion coating on at least part of the surface of the metallic body;
II.1.2.2) applying a coating comprising an epoxy resin on at least part of the conversion coating obtained in (II.1.2.1), by means of a process selected from the group consisting of spraying and surface coating, preferably deposition coating, more preferably by means of cathodic deposition coating.
44. The process for producing a damping element according to any of embodiments 41 to 43, wherein the further body comprises a coating comprising an epoxy resin on at least part of its surface, wherein (II.2) preferably comprises:
  II.2.1) providing at least one further body having a surface, preferably at least one further body comprising an iron alloy or aluminum;
  II.2.2) applying a coating comprising an epoxy resin to at least part of the surface of the further body, preferably by means of a process selected from the group consisting of spraying and surface coating, more preferably deposition coating, more preferably by means of cathodic deposition coating,
  to give a further body having a surface and a coating comprising an epoxy resin on at least part of its surface; where preferably the further body, between its surface and the coating comprising an epoxy resin, has a conversion coating which comprises at least one compound selected from the group of zirconium(IV) oxide, zinc(II) phosphate, and chromate, preferably at least zirconium(IV) and/or zinc phosphate, more preferably at least zirconium(IV) oxide.
45. The process for producing a damping element according to any of embodiments 41 to 44, wherein the epoxy resin used in (II.1.2) and, respectively, in (II.2.2) is preferably an epoxy resin which is preferably obtained or obtainable from a water-containing epoxy resin dispersion which has preferably more than 50 weight % of water, based on the total weight of the water-containing epoxy resin dispersion.
46. The process for producing a damping element according to embodiment 39 or 43 to 45, wherein the epoxy resin dispersion comprises an epoxy resin having ammonium groups, obtained or obtainable by
  A) reacting at least the components
    i) a precursor prepared or preparable, with addition of phosphines and/or phosphine salts as catalyst, from
      i.a) at least one diepoxide compound;
      i.b) at least one mono- or diphenol or a mixture of a mono- and a diphenol;
    ii) at least one organic amine;
    at an addition temperature in the range from 60 to 130° C. to give an epoxide-amine adduct;
  B) subsequently or simultaneously reacting the secondary hydroxyl groups, formed in the reaction of components i.a) and i.b), with epoxide groups of the epoxide-amine adduct prepared in stage A), at a temperature of 110 to 150° C.,
  C) adding at least one crosslinking agent at a temperature of <150° C., D) neutralizing;
E) dispersing the mixture obtained in stages A) to D) in water.

47. The process for producing a damping element according to any of embodiments 39 or 43 to 46, wherein, for the application of the coating according to embodiment 39 or the coating according to (II.1.2) and (II.2.2), a cathodic deposition coating is used, in which case the applied voltage is preferably in the range from 50 to 500 volts, preferably in the range from 100 to 400 volts, more preferably in the range from 200 to 350 volts.

48. The process for producing a damping element according to any of embodiments 39 or 43 to 47, wherein, for the application of the coating according to embodiment 39 or the coating according to (II.1.2) and (II.2.2), a cathodic deposition coating is used, the coating time being in the range from 50 to 500 seconds, preferably in the range from 100 to 300 seconds, more preferably in the range from 120 to 240 seconds.

49. The process for producing a damping element according to any of embodiments 39 or 43 to 48, wherein, for the application of the coating according to embodiment 39 or the coating according to (II.1.2) and (II.2.2), a cathodic deposition coating is used, the anode/cathode ratio being in the range from 1:10 to 10:1, preferably in the range from 1:6 to 1:4.

50. The process for producing a damping element according to any of embodiments 39 or 43 to 49, wherein the coating obtained according to embodiment 39 or according to (II.1.2) and (II.2.2) has a layer thickness in the range from 1 to 100 micrometers, preferably in the range from 5 to 60 micrometers, more preferably in the range from 10 to 50 micrometers, more preferably in the range from 20 to 40 micrometers, determined according to DIN EN ISO 2808.

51. The process for producing a damping element according to any of embodiments 39 or 43 to 50, wherein the coating obtained according to embodiment 36 or according to (II.1.2) and (II.2.2) has a dry film density in the range from 0.5 to 5 g/cm$^3$, preferably in the range from 1 to 2.5 g/cm$^3$, more preferably in the range from 1.1 to 2.0 g/cm$^3$, more preferably in the range from 1.3 to 1.4 g/cm$^3$ determined according to DIN 53219.

52. The process for producing a damping element according to any of embodiments 39 to 51, wherein the introducing of the plastics composition according to (II.3) comprises:
II.3.1) providing a first component of the plastics composition, preferably an isocyanate composition, preferably an isocyanate-terminated prepolymer of the plastics composition;
II.3.2) providing a second component of the plastics composition, preferably the polyol composition of the plastics composition, more preferably the remaining polyol composition of the plastics composition;
II.3.3) mixing the first and second components of the plastic composition;
to give a reactive mixture of the plastics composition;
II.3.4) introducing the reactive mixture according to (II.3.3) into that part of the mold from (II.2) that has remained empty.

53. A damping element obtained or obtainable by the process according to any of embodiments 39 to 52.

54. The use of a composite element according to any of embodiments 1 to 15 or of a damping element according to any of embodiments 16 to 34 for a motor vehicle component, more particularly an automobile component, an aircraft component or a nautical component, preferably for an automobile component.

The examples that follow serve to illustrate the invention, but are in no way limiting with respect to the subject matter of the present invention.

EXAMPLES

1. Chemicals

| Name | Chemical name |
| --- | --- |
| Epoxy resin 1 | Epoxy resin containing ammonium groups, obtained from binder dispersion C/example 2.3 of EP 0 961 797 B1 |
| Prepolymer 1 | Prepolymer based on diphenylmethane 4,4'-diisocyanate; carbodiimide-modified 4,4'-MDI, linear polyester diol having a hydroxyl number in the range from 35 to 120 mg KOH/g, synthesized from adipic acid, ethylene glycol and 1,4-butanediol, and/or branched polyester diol having a hydroxy number in the range from 35 to 120 mg KOH/g, synthesized from adipic acid, ethylene glycol and 1,4-butanediol; having an NCO content in the range from 10 to 28 weight % |
| Prepolymer 2 | Prepolymer based on diphenylmethane 4,4'-diisocyanate; carbodiimide-modified 4,4'-MDI, linear polyetherol having a hydroxyl number in the range from 35 to 120 mg KOH/g, having an NCO content in the range from 10 to 28 weight % |
| Polyol 1 | Linear polyester diol having a hydroxyl number in the range from 35 to 120 mg KOH/g, synthesized from adipic acid, ethylene glycol and 1,4-butanediol |
| Polyol 2 | Linear polyetherol having a hydroxy number in the range from 35 to 140 mg KOH/g, synthesized from polytetrahydrofuran and 1,4-butanediol |
| Chain extender 1 | 1,4-butanediol |
| Cellular polyurethane | Obtained according to example 1 of EP 1 379 568 B1 |
| Conversion coating 1 | Zirconium(IV) oxide/polyorganosiloxane (Oxsilan ® OS9832) |
| Conversion coating 2 | Tricationic zinc phosphating (Zn, Ni, Mn phosphate) (Gardobond ® R26/1) |
| Conversion coating 3 | Zirconium(IV) oxide/molybdenum oxide (Gardobond ® GBX 4595) |
| PU adhesion promoter | Reaction product based on xylene, ethylbenzene, butanone, 2-methoxy-1-methylethyl acetate, toluene and butan-1-ol (Chemosil X 5960-22, Fa. Lord) |

Binder Dispersion C/Example 2.3 of EP 0 961 797 B1:

| Resin mixture: | |
| --- | --- |
| Parts by weight | |
| 1128 | Epoxy resin (based on bisphenol A, EEW 188) |
| 228 | Bisphenol A |
| 94 | Phenol |
| 1.5 | Triphenylphosphine EEW = 478 |
| 156.7 | Plastilit 3060 (polypropylene glycol compound, BASF) |
| 115.5 | Diethanolamine |
| 61.2 | N, N-Dimethylaminopropylamine, intermediate viscosity 1.7 dPas (plate stroke cone viscometer at 23° C., 40% in Salvenon PM) |
| 97.6 | Butyl glycol |
| 812 | Crosslinker* |

-continued

Resin mixture:

Parts by weight

*Crosslinker obtained as per example 1 of EP 0 961 797 B1 by reaction of 1084 g of isomers and higher polyfunctional oligomers based on diphenylmethane 4,4'-diisocyanate, with an NCO equivalent weight of 135 (Basonat® A270, BASF; NCO functionality about 2.7; diphenylmethane 2,2'- and 2,4'-diisocyanate content below 5%) under nitrogen atmosphere. Addition of 2 g of dibutyltin dilaurate and dropwise addition of 1314 g of butyl diglycol at a rate such that the product temperature remained below 70° C., cooling if appropriate. After the end of the addition, the temperature was held at 70° C. for a further 120 min. On subsequent checking, no more NCO groups were detectable. Cooling took place to 65° C.; the solids content was > 97% (1 h at 130° C.).

Dispersion:

| Parts by weight | |
|---|---|
| 2400 | Resin mixture (described above) |
| 2173 | Demin. water |
| 49.3 | Glacial acetic acid |
| 2751.7 | Demin. water |

The dispersion was prepared as described in example 2.1 of EP 0 961 797 B1.

Dispersion characteristics:
Solids content (1 h at 130° C.)=45.1%
M EQ-Base 0.822 meg/g resin solids
M EQ-Acid=0.375 meg/g resin solids
pH 5.9
Conductivity 2.7 mS/cm
Mean particle size=1450 angstroms (light scattering method)
Settling stability No sediment after storage for 2 months at room temperature
Viscosity: 22 sec (DIN4 cup at 23° C.)
Solvent content 1.7% butyl glycol (gas chromatography)

2. Examples 2.1 Application of Cathodic Deposition Coating (CED) Coating/Production of Coated Metallic Bodies A metallic body of steel was coated on parts of its surface with epoxy resin 1 in a CED unit from Kesseböhmer (Germany) by cathodic deposition coating. The details of the CED are listed below:
Bath batch (for 5 kg):
2.5 kg demin. water (fully demineralized water)
2.0 kg Binder dispersion C/epoxy rein 1
0.5 kg Pigment paste comprising epoxy resin 1 as aqueous solution Fillers, pigment
Bath characteristics:
Bath temperature 32 to 35° C.
Conductivity as per DIN EN ISO 15091 1.0 to 1.6 mS/cm
pH as per DIN 55659-1 4.8 to 5.2
Nonvolatile fraction (NVF) as per DIN EN ISO 3251 (30 min 180° C.) 18 to 20 weight %
Application conditions:
Voltage 200 to 350 volts
Coating time 120 to 240 seconds
Layer thickness as per DIN EN ISO 2808 20 to 40 μm
Anode/cathode ratio 1:6 to 1:4
After the cathodic deposition coating, the coated metallic body obtained was rinsed off with fully demineralized water. The coated metallic body was subsequently subjected to baking under the following conditions.

Baking conditions:
Substrate temperature 175° C.
Duration >15 minutes 2.2 Embedding in Casting Elastomer/Production of Damping Element a) Damping Element, Especially for Shock Absorber Applications To produce a damping element, the coated metallic body obtained from 2.1 was introduced into a casting mold, in which a plastics body comprising a cellular polyurethane was likewise introduced. After prior heating to 45° C. or >45° C., respectively isocyanate component (here prepolymer 1) and polyol component (polyol 1) were combined in a mixing head and subsequently introduced in the form of a reactive mixture into the part of the mold remaining empty between coated metallic body and plastics body, and reacted at a temperature in the range from 80 to 100° C. A thermal aftertreatment took place for an interval at 24 to 48 hours at a temperature in the range from 80 to 100° C. The coated metallic body used is shown schematically in FIG. 1, the resulting damping element being shown schematically in FIG. 2.

b) Damping Element, Especially for Round Bearing Applications

For the production of a damping element, a metallic body in the form of a (hollow) cylinder (inner sleeve) and also a further, likewise metallic, body in the form of a further hollow cylinder (outer sleeve) as shown in FIG. 3 were each coated in analogy to the process described in 2.1; in the case of the inner sleeve, the coating was applied at least to part of the outer surface, and in the case of the outer sleeve, the coating was applied at least to part of the inner surface. The coated metallic bodies obtained were introduced into a casting mold, with the inner sleeve positioned within the outer sleeve. After prior heating to 45° C. or >45° C., respectively isocyanate component (here prepolymer 1) and polyol component (polyol 1) were combined in a mixing head and subsequently introduced in the form of a reactive mixture into the part of the mold remaining empty between inner sleeve and outer sleeve, and reacted at a temperature in the range from 80 to 100° C. A thermal aftertreatment took place for an interval of 24 to 48 hours at a temperature in the range from 80 to 100° C. A section through the round bearing obtained is shown schematically in FIG. 4.

2.3 Study of the Adhesive Strength

An adhesion test took place in accordance with DIN EN 1465 (Adhesives—Determination of lap-shear strength of overlap bonds). Deviating from DIN EN 1465, the sample geometry was adapted in terms of the specific material and specific fabrication. Two substrate bodies (metallic body having a coating, details of the coating indicated below) were each positioned as shown in FIG. 3, with—in the overlap region—a plastics body, presently a layer 2 mm thick of a plastics composition comprising a polyurethane obtained from the components prepolymer 1, polyol 1 and chain extender 1, being present. To compensate for the higher bending moment as a result of the greater layer thickness, the substrate thickness was set at 4 mm, in order to minimize bending during the test. The dimensions of the (adhesive) sample can be seen in FIG. 5; all of the numerical values given in FIG. 5 refer to mm (e.g. 12.5=12.5 mm).

The samples, consisting of substrate (metallic body with coating) and plastics composition in the overlap region, were produced in a self-heated casting tool under the same conditions as for the production of the damping elements in 2.2, in order to ensure comparability between the adhesion of the specimens and the adhesion of the damping elements or of the composite elements contained in the damping element.

The sample was accommodated using wedge screw grips from Zwich Roell, type 8306 or type 8406. The primary tightening force was achieved through wedge action. The tightening force was proportional to the instantaneous tensile force (self-tightening), thus ensuring secure tightening of a wide variety of different materials. The wedge screw grip also allowed the sample to be tightened asymmetrically, in order to compensate for the offset between the upper and lower substrates and so to prevent a bending stress on the adhesive sample.

The specimen was loaded to breaking point. For each sample, the maximum force during the destruction was recorded as the breaking force. The test results for the relevant samples were reported through the arithmetic mean and the variation coefficient for the breaking force in newtons or the breaking stress in megapascals.

The lap shear strength, in megapascals, was calculated by dividing the breaking force in newtons by the bond area in square millimeters.

In the study, the adhesive strength was compared between plastic body and two different surface coatings on the substrates. The metallic body of the substrates was made from a steel material. For one specimen, the substrates used were metallic bodies having a zinc-iron coating (ZnFe) applied by electroplating. For a further specimen, the substrates used were metallic bodies with an epoxy resin layer applied by cathodic deposition coating.

In the study of the breaking force under a lap shear load on the specimens, it was clearly apparent that for the specimen with the epoxy resin applied by CED to the metallic body of the substrates, the breaking force was well above the breaking force of a sample specimen in which the metallic body had an electroplated ZnFe coating. Furthermore, the fracture was cohesive in the plastics body. A comparison of the lap shear strengths of specimens with ZnFe-coated substrate and epoxy resin-coated substrate is shown in FIG. 6

2.4 Destructive Testing of the Bonded Assembly Between Metallic Body and the Plastics Body Destructive testing of the bonded assembly between the coated metallic body and the plastics body of a damping element was carried out in order to validate the suitability using an actual component. For this, the plastic body of a damping element was held as per 2.2 with a suitable apparatus, and the metallic body was loaded so that the boundary layer between plastics body and metallic body underwent a lap shear stress to breaking point. The same study was carried out for a damping element which contained only a ZnFe-coated metallic body. Here again, there was a distinct increase apparent in the bursting force of the damping elements when using a metallic body having an epoxy resin coating rather than a ZnFe coating, and there was also a change in the fracture mode from adhesive to cohesive. The comparison is shown in graph form in FIG. 7. The apparatus used is shown schematically in FIG. 8.

2.5 Evaluation Based on 2.3 and 2.4

Where steel materials are used as the metallic body in damping elements, sufficient corrosion control must be ensured. This is typically ensured by means of a zinc-nickel coating (ZnNi) or by a zinc-iron coating (ZnFe) applied on the metallic body by electroplating. To date, the plastics body has been applied by means of polyurethane (PU) reactive casting processes with direct adhesion to the ZnFe or ZnNi coating. By application of a lap shear force above the breaking force, however, there was adhesive detachment of the PU plastics body from the ZnFe or ZnNi coating. In order to ensure sufficient robustness on the part of the damping element, however, a cohesive fracture in the PU plastics body must be the target in a lap shear test. This is typically achieved by application of a standard 1- or 2-component wet-chemical adhesion promoter. The application of an additional adhesion promoter to the corrosion control layer, however, entails additional costs. Especially if the adhesion promoter can only be applied partially, in order to keep screw attachment faces on the metallic body free, for example, the application process is inconvenient and involves high costs, so making the damping element uneconomic to produce.

It was found in the context of the present invention that a coating by means of cathodic electrodeposition coating based on epoxy resin—shown here with epoxy resin 1—was markedly superior in relation to the requirements for promotion of adhesion between a plastics body and a metallic body to a pure electroplated corrosion control coating (ZnNi or ZnFe) and met the requirements for adhesion promotion between a plastics body and a metallic body equally well as a combination of a conventional electroplated corrosion control coating (ZnNi or ZnFe) and an adhesion promoter applied additionally for that purpose. Surprisingly it was found that the cathodic electrodeposition coating based on epoxy resin had the advantage that it fulfilled at the same time the function of corrosion control and of adhesion promotion, and was therefore much lower in terms of the processing costs and the number of required processing steps than when using an electroplated form of corrosion control with additional wet-chemically applied adhesion promoter.

Additionally, the epoxide layer can also be used in the region of the screw connection of the damping elements, thereby enabling a more economic electrodeposition process for coating, rather than expensive partial application of an adhesion promoter by means of spraying processes. As a result, even in the case of metallic bodies from nonferrous metals, such as aluminum, for example, where no additional corrosion control is needed, the CED process is more economic for promoting adhesion than an adhesion promoter applied partially, wet-chemically.

2.6 Application of Cathodic Electrodeposition (CED) Coating/Production of Coated Metallic Bodies with Prior Application of a Conversion Coat Pressed aluminum (EN AW 6082) and steel flat bars (Domex 650 MC) were cut to form flat profiles of 110×25×4 mm, and 6 each of the flat profiles were subsequently coated over the whole surface with a conversion coat, by commercially available processes for automotive finishes, and subsequently left as they were or, for comparison, surface-coated with epoxy resin 1 as described in 2.1 by cathodic electrodeposition (CED) coating. Table 1 shows the applied layers and the respective layer thickness.

TABLE 1

Characterization of surface coating of the metal profiles.

| Type of conversion coating | No CED Layer thickness [µm] | With CED (Epoxy resin 1) Layer thickness [µm] |
|---|---|---|
| — | Aluminum (EN AW 6068) | |
| Conversion coating 1 | 0.1-0.25 | 15-17 |
| Conversion coating 2 | 2 | 19 |
| Conversion coating 3 | 0.2 | 16 |
| — | Steel (Domex 650 MC) | |
| Conversion coating 1 | 0.1-0.25 | 16-24 |
| Conversion coating 2 | 2 | 21-25 |

For comparative examples, 10 each of the untreated aluminum or steel flat profiles were roughened by sandblasting with corundum ($R_z$=20-25 µm) and treated with PU adhesion promoter. The layer applied was dried in air for 1 h (layer thickness: 14.2±0.7 µm) and subsequently cured at 120° C. for 2 h.

2.7 Study of the Adhesive Strength

An adhesion test took place, for the metallic bodies coated according to 2.6, in accordance with DIN EN 1465 (Adhesives—Determination of lap-shear strength of overlap bonds).

Pairs of flat profiles with the same surface treatment as per 2.6 were introduced at 90° C. into a casting mold designed in accordance with FIG. 5, heat-treated for 30 minutes, and cast with a compact PU based on pTHF (polyurethane obtained from the components prepolymer 2 and polyol 2) along the adhesion surface. After 30 minutes, demolding took place, with heat treatment at 90° C. for a further 24±2 h.

The adhesion test was carried out on a Z010 TH machine (Zwick Roell) with a testing velocity of 5 mm/min along the linear tensile direction (test temperature: 23±2° C.).

The results of the shear adhesion forces are summarized in table 2 and shown for comparison in FIGS. 8 and 9.

TABLE 2

Results of the shear adhesion forces

| Surface treatment/coating | No CED SBS [MPa] | With CED (Epoxy resin 1) SBS [MPa] |
|---|---|---|
| — | Aluminum (EN AW 6068) | |
| Conversion coating 1 | 1.0 ± 0.3 | 31.5 ± 7.6 |
| Conversion coating 2 | 0.7 ± 0.0 | 36.2 ± 2.5 |
| Conversion coating 3 | 1.2 ± 0.4 | 33.3 ± 2.7 |
| none | — | 17.2 ± 0.6 |
| sandblasting, PU adhesion promoter | 30.6 ± 5.4 | — |
| — | Steel (Domex 650 MC) | |
| Conversion coating 1 | 1.6 ± 0.3 | 39.0 ± 3.1 |
| Conversion coating 2 | 0.9 ± 0.2 | 29.1 ± 5.2 |
| Sandblasting, PU adhesion promoter | 32.3 ± 0.3 | — |

Within the present invention it has been possible to show that an epoxy resin-based coating by means of cathodic electrodeposition—shown here with epoxy resin 1—and additional conversion coating below the CED coating was markedly superior, in relation to the requirements for promotion of adhesion between a plastics body a metallic body, to a pure CED coating and, respectively, to a pure conversion coating, and that it met the requirements for promotion of adhesion between a plastics body and a metallic body much better, including much better than a combination of a conventional electroplated corrosion control coating (ZnNi or ZnFe) and of an adhesion promoter additionally applied for this purpose. The results are comparable with or even better than those achieved by sandblasting and with a commercially customary PU adhesion promoter. The approach using sandblasting and a PU adhesion promoter is much more complicated by comparison with the variant according to the invention: the application of the PU adhesion promoter requires tape masking and then partial spraying. The variant according to the invention, with the conversion coating and CED (deposition), is much simpler and economically advantageous.

REFERENCE NUMERALS

1 Coated metallic body
2 Metallic body
3 Coating
4 Damping element
5 Composite element
6 Plastics body
7 Further body
8 Inner surface
9 Outer surface

CITED LITERATURE

Figure 1:
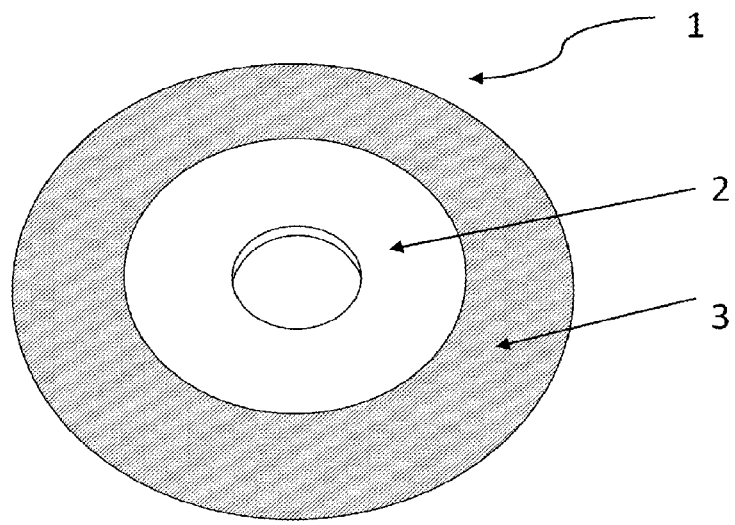
FIG. 1 shows a perspective view of a coated metallic body 1, with the metallic body 2 being present here in the form of a ring which has a coating 3 comprising an epoxy resin on at least part of its surface.
Figure 2:
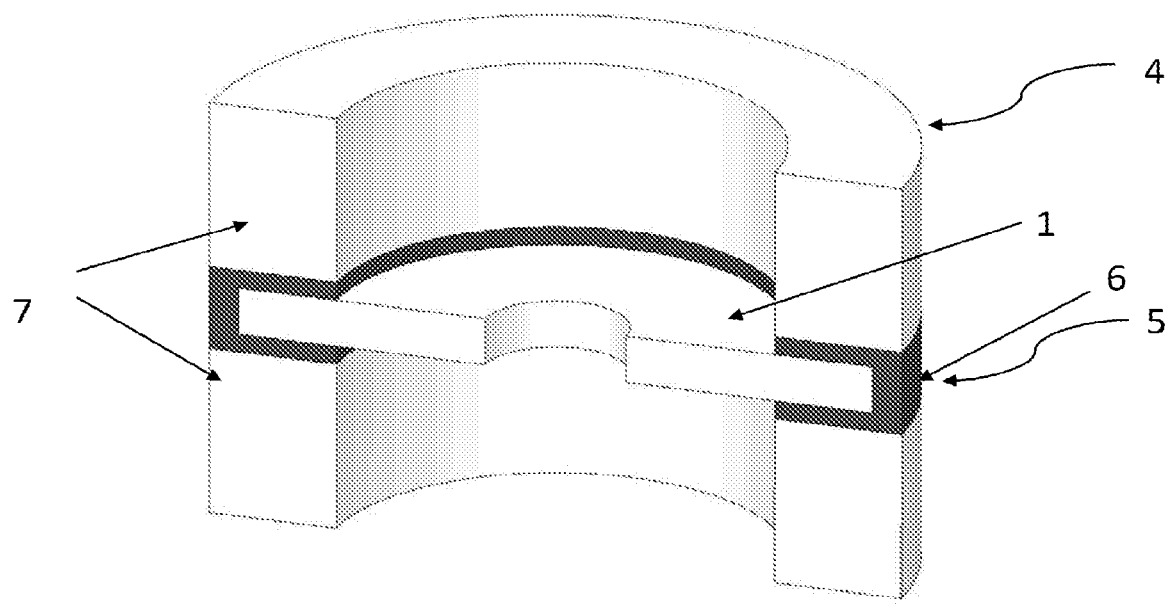
FIG. 2 shows a section through a damping element 4, comprising a composite element 5 which has a plastics body 6 comprising at least one polyurethane and a coated metallic body 1, which is in turn at least partly surrounded by a further body 7, here a further plastics body 7.
Figure 3:
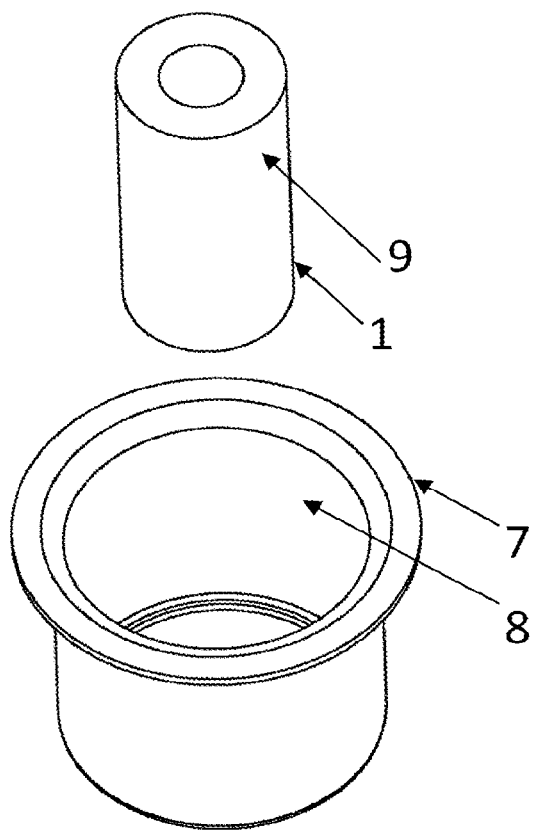
FIG. 3 shows a metallic body 1 in the form of a (hollow) cylinder (inner sleeve), and a further, likewise metallic body 7 in the form of a further hollow cylinder (outer sleeve) for a round bearing, where the outer sleeve has a coating at least on part of its inner surface 8 (not shown) and the inner sleeve has a coating at least on part of its outer surface 9 (not shown)
Figure 4:
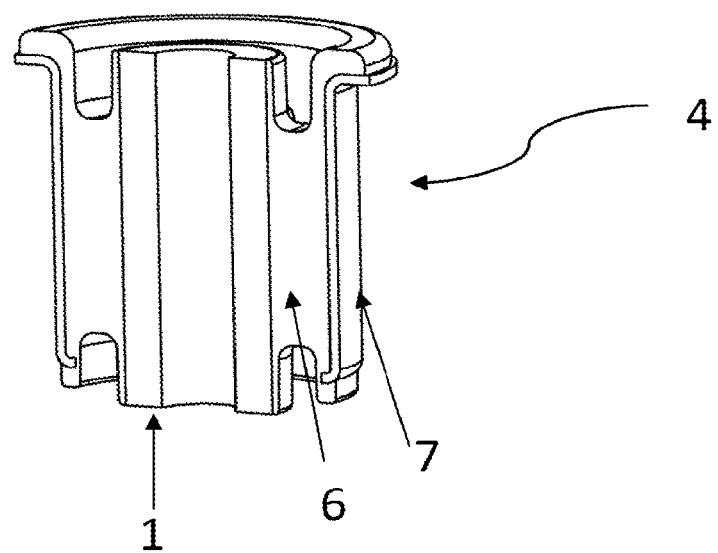
FIG. 4 shows a section through a round bearing comprising an inner sleeve 1, an outer sleeve 7, and a plastics body 6 between inner and outer sleeves.
Figure 5:
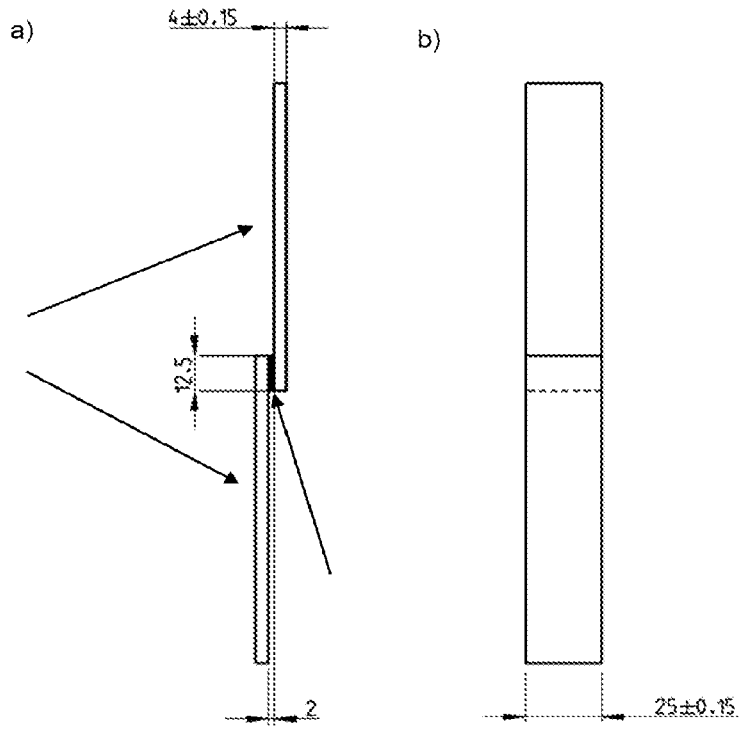
FIG. 5 shows, schematically, a sample body used for the study of the adhesive strength, where the numerical figures are to be understood as length figures in millimeters (e.g. 12.5=12.5 mm), and where (a) shows a side view and (b) shows the corresponding front view.
Figure 6:
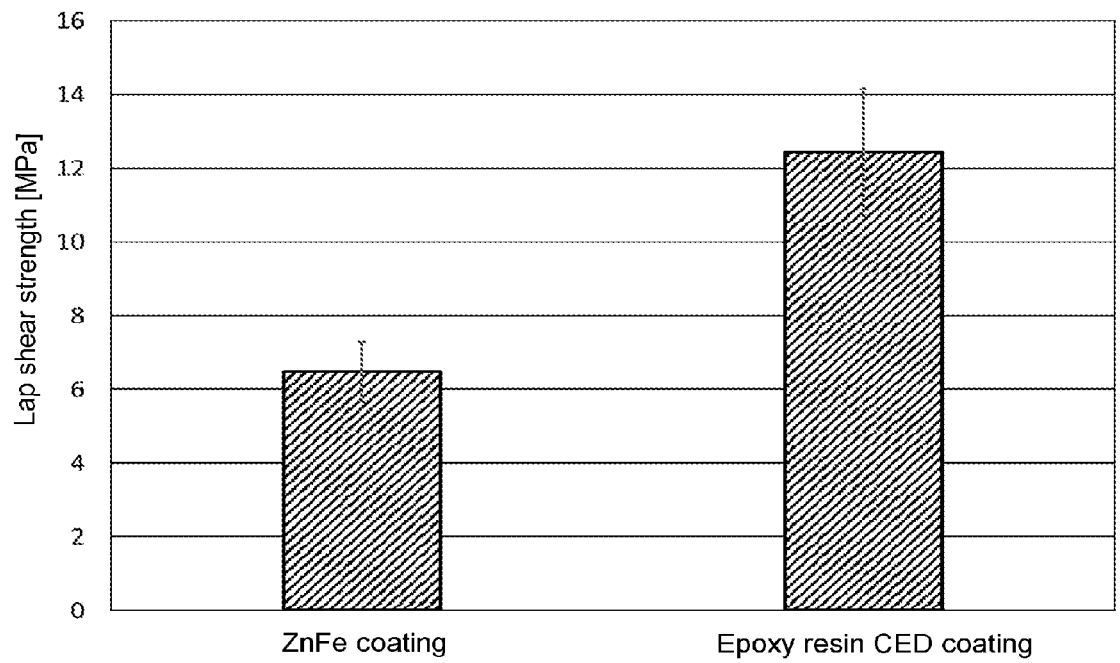
FIG. 6 shows the results of the adhesive strength studies (lap shear strength) for an epoxy resin-coated metallic body+plastics body in comparison to a metallic body electroplated with ZnFe+plastics body.
Figure 7:
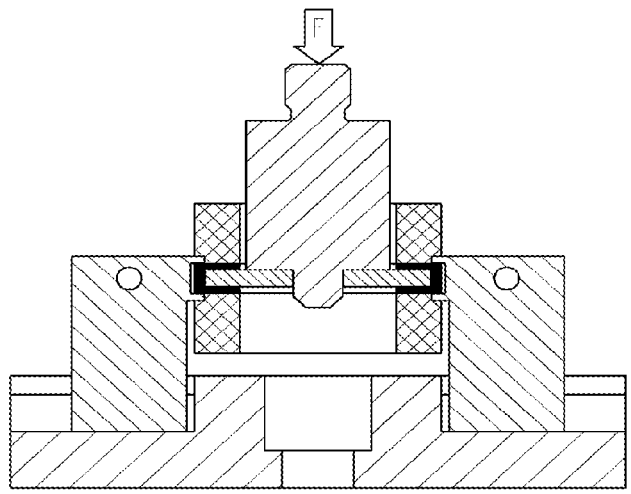
FIG. 7 shows the results of the bursting force studies for a damping element based on an epoxy resin-coated metallic body+plastics body, in comparison to those for a damping element based on a metallic body electroplated with ZnFe+plastics body.
Figure 8:
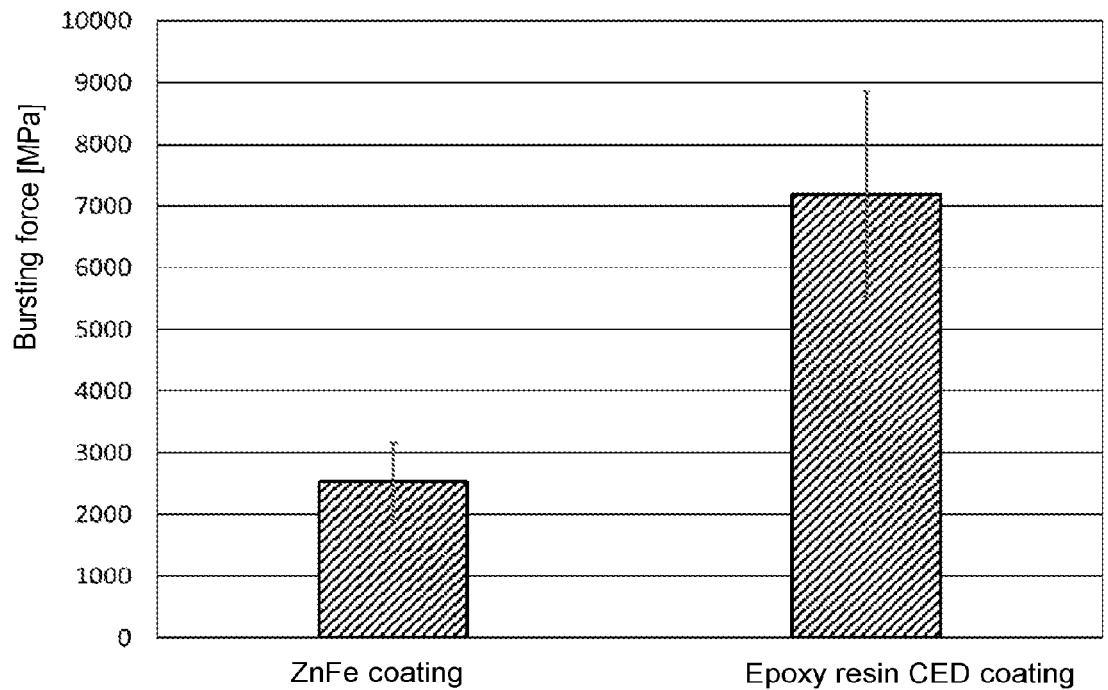
FIG. 8 shows, schematically, the apparatus (bursting test bearing) used for the bursting test studies.
Figure 9:
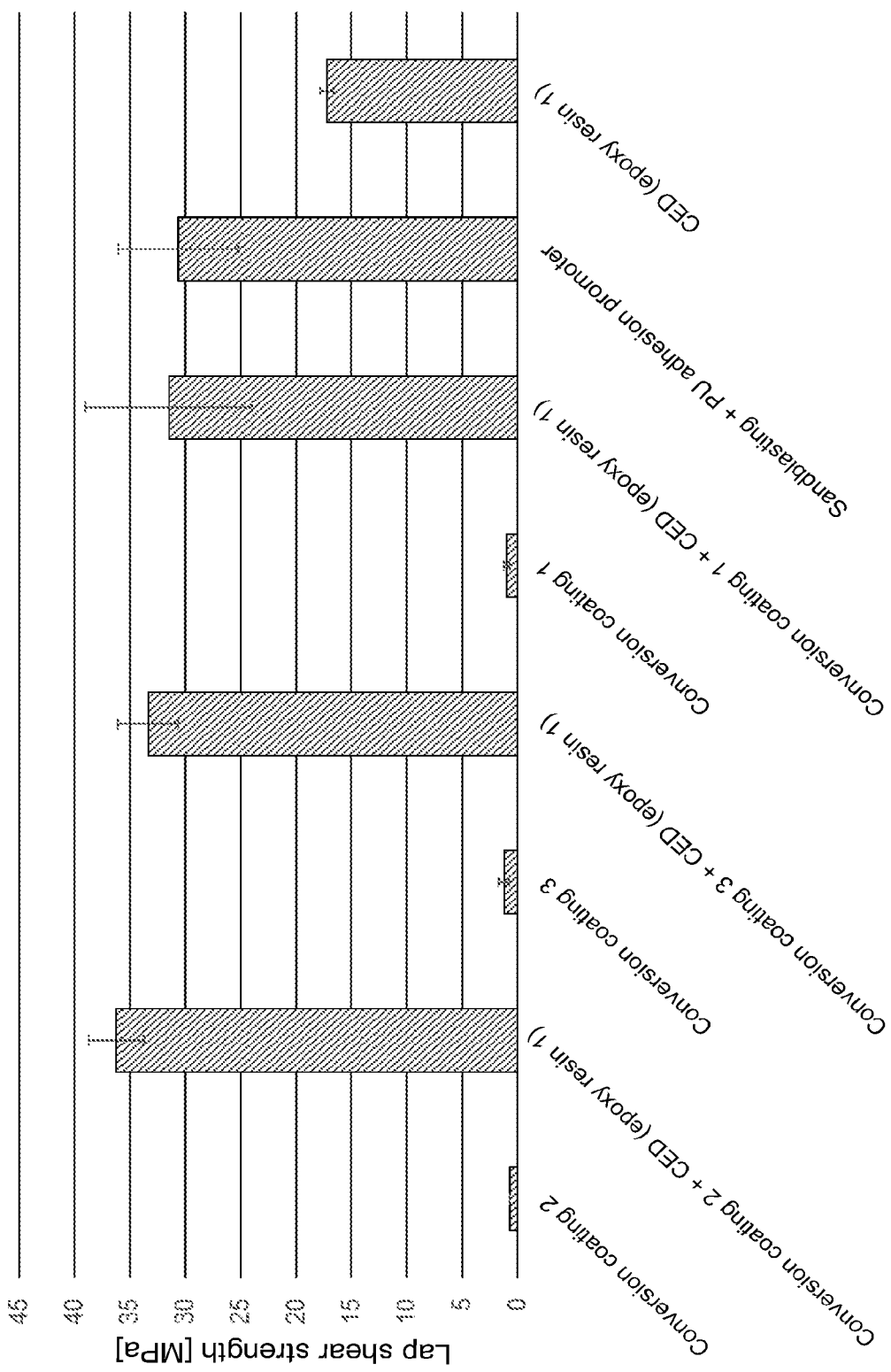
FIG. 9 shows the results of the adhesive strength studies (lap shear strength) for a conversion-coated and epoxy resin-coated metallic body (aluminum)+plastics body in comparison to a metallic body (aluminum) which has only been conversion-coated+plastics body and in comparison to a metallic body (aluminum) which has been sandblasted and coated with a conventional PU adhesion promoter+plastics body.
Figure 10:
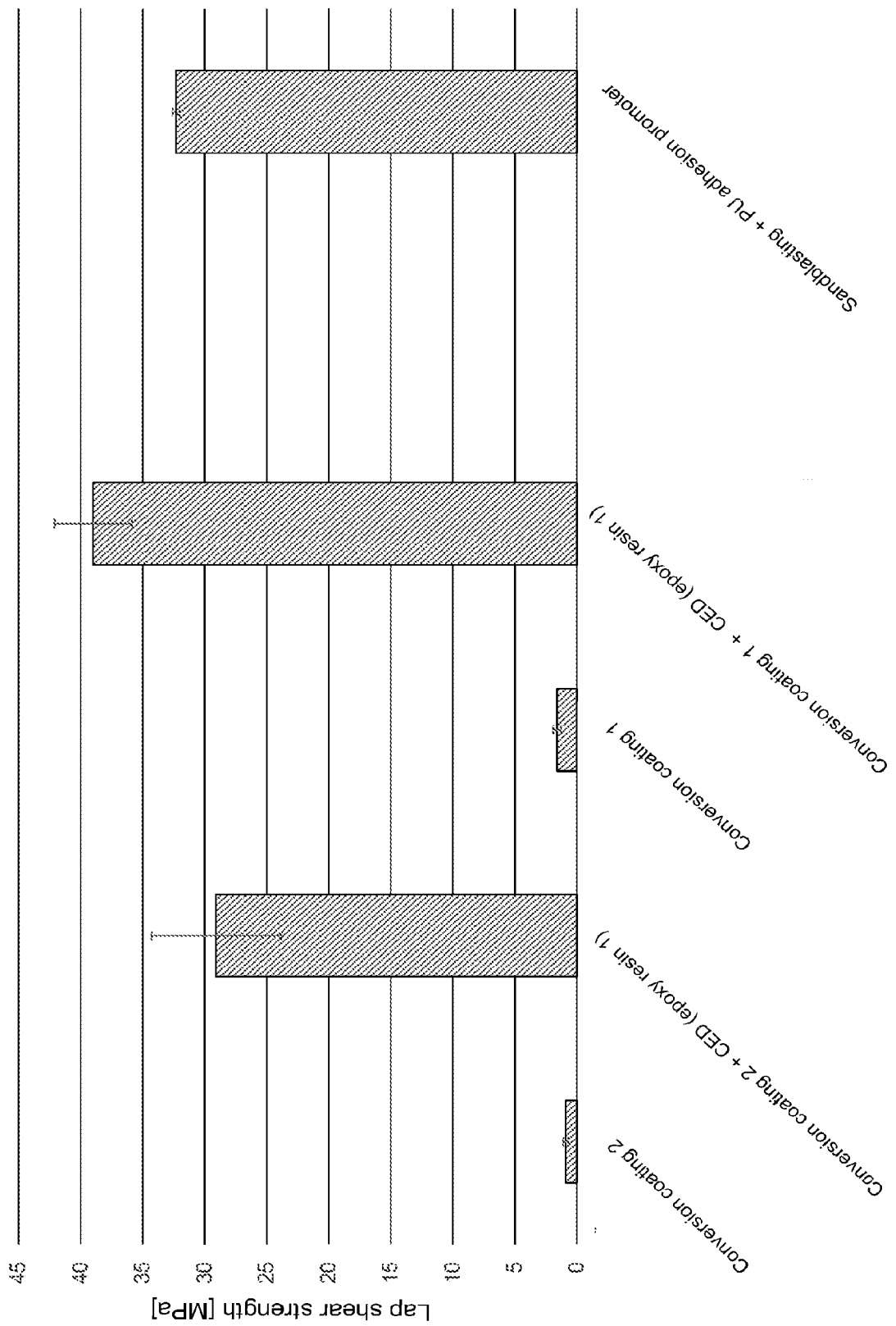
FIG. 10 shows the results of the adhesive strength studies (lap shear strength) for a conversion-coated and epoxy resin-coated metallic body (steel)+plastics body in comparison to a metallic body (steel) which has only been conversion-coated+plastics body and in comparison to a metallic body (steel) which has been sandblasted and coated with a conventional PU adhesion promoter+plastics body.

U.S. Pat. No. 8,459,621 B1
EP 0 961 797 B1
EP 1 379 588 B1
EP 1 171 515 B1

The invention claimed is:

1. A shock absorber comprising a damping element,
wherein the damping element comprises (1) a composite element and (2) a further body which is at least partly in direct contact with the composite element,
wherein the composite element comprises:
   a) a metallic body having a surface;
   b) a coating comprising an epoxy resin on at least part of the surface of the metallic body of (a); and
   c) a plastics body comprising a polyurethane, which at least partly surrounds the metallic body of (a) and, in a region in which the plastics body at least partly surrounds the metallic body, is at least partly in direct contact with the coating of (b),
wherein the composite element of (1) has, between the surface of the metallic body of (a) and the coating of (b), a conversion layer (d) which comprises a compound selected from the group of consisting of zirconium(IV) oxide, zinc(II) phosphate, and chromate,
wherein the metallic body has an annular or perforated disk shape with a central hole,
wherein the coating comprising the epoxy resin is on at least an outer part of the surface of the metallic body,
wherein the plastics body is between the metallic body and the further body,
wherein the further body has a coating comprising an epoxy resin on at least part of its inner surface, and
wherein the further body comprises a polyurethane body.

2. The shock absorber element of claim 1, wherein the polyurethane body is a cellular polyurethane.

3. The shock absorber element of claim 1, wherein the polyurethane body is a cellular polyurethane having a density in the range from 200 to 1100 kg/m$^3$.

4. The shock absorber element of claim 1, wherein the metallic body of (a) comprises an iron alloy or aluminum.

5. The shock absorber element of claim 4, wherein the metallic body of (a) comprises steel as the iron alloy.

6. The shock absorber element of claim 1, wherein the polyurethane body is a cellular polyurethane having a density in the range from 200 to 750 kg/m$^3$.

7. A process for producing the shock absorber element of claim 1, the process comprising:
   (1) introducing the metallic body the coating comprising the epoxy resin on at least part of the surface of the metallic body into a mold,
   (2) introducing the further body into the mold, with a part of the mold remaining empty; and
   (3) introducing a plastics composition into the part of the mold from (2) that has remained empty.

* * * * *